US008882600B2

(12) United States Patent
Okada et al.

(10) Patent No.: US 8,882,600 B2
(45) Date of Patent: Nov. 11, 2014

(54) GAMING MACHINE

(75) Inventors: Kazuo Okada, Tokyo (JP); Masaki Matsuno, Tokyo (JP); Jun Hirato, Tokyo (JP); Tetsuya Yokota, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 692 days.

(21) Appl. No.: 13/122,230

(22) PCT Filed: Oct. 28, 2009

(86) PCT No.: PCT/JP2009/068482
§ 371 (c)(1), (2), (4) Date: Apr. 1, 2011

(87) PCT Pub. No.: WO2010/053030
PCT Pub. Date: May 14, 2010

(65) Prior Publication Data
US 2011/0201424 A1 Aug. 18, 2011

Related U.S. Application Data

(60) Provisional application No. 61/112,925, filed on Nov. 10, 2008, provisional application No. 61/114,170, filed on Nov. 13, 2008.

(51) Int. Cl.
*A63F 13/00* (2014.01)
*G07F 17/32* (2006.01)

(52) U.S. Cl.
CPC ............ *G07F 17/32* (2013.01); *G07F 17/3216* (2013.01)
USPC ............ 463/46

(58) Field of Classification Search
USPC ............ 463/31, 16–20, 46
See application file for complete search history.

(56) References Cited

U.S. PATENT DOCUMENTS 6,612,928 B1 * 9/2003 Bradford et al. ................ 463/29
2004/0160148 A1 * 8/2004 Hedrick et al. ............ 312/223.1
2006/0063591 A1 * 3/2006 Gauselmann ................ 463/30
2006/0281559 A1 * 12/2006 Luciano ................ 463/46
2008/0113821 A1 * 5/2008 Beadell et al. ................ 463/46

FOREIGN PATENT DOCUMENTS

JP 303 0068 10/1996
JP 2000 254 349 9/2000
JP 2004 267 315 9/2004

OTHER PUBLICATIONS

International Search Report Issued Feb. 2, 2010 in PCT/JP09/68482 filed Oct. 28, 2009.

* cited by examiner

*Primary Examiner* — David L Lewis
*Assistant Examiner* — Eric M Thomas
(74) *Attorney, Agent, or Firm* — KMF Patent Services, PLLC; S. Peter Konzel; Kenneth M. Fagin

(57) ABSTRACT

A slot machine has a frontward projecting portion which is projected frontward of the slot machine from a lower end of a main display provided in a cabinet. The frontward projecting portion has an armrest, a control panel, etc., each of which serves as a human contact portion which comes in contact with a part of a player's body. The lower end of a display surface of the main display is positioned lower than the human contact portions (armrest and control panel).

13 Claims, 14 Drawing Sheets

GAMING MACHINE

TECHNICAL FIELD

A gaming machine according to one or more aspects of the present invention relates to a gaming machine having a display for displaying information concerning a game, and an armrest.

BACKGROUND ART

In gaming machines such as slot machines, roulette game machines or card game machines using coins or the like as gaming media, players start a predetermined game by inserting coins in such gaming machines. At this time, displays provided in such gaming machines display identification patterns (for instance, images of the reels in the case of slot machines, images of the wheel in the case of roulette game machines, or images of cards in the case of card game machines) and game images concerning the game, such as effect screens and the like. The displays provided in such gaming machines also display lottery results of lotteries carried out in the gaming machines.

Among these gaming machines, a so-called slant-type gaming machine, at which a player plays games in a seated position, generally has a member called an armrest for supporting the arms of the player thereat. When a player plays games at such a slant-type gaming machine, he/she operates a controller provided on the upper surface of the armrest, with his/her arms placed on the armrest.

These gaming machines may be each provided with a player-information acquisition device. Such a player-information acquisition device has a reading device. The reading device reads out information of a player from a storage medium (e.g., a card-type storage medium) which stores the information of the player with respect to a game. The information of the player includes a piece of information on a game result history. In other words, a manager of a game arcade or the like can acquire the information of the player with respect to a game through the player-information acquisition device. The player-information acquisition device may also have a display device in addition to the reading device. The display device displays thereon the information read out by the reading device to thereby notify the player of the contents of the information. Such a player-information acquisition device is called a PTS (Player Tracking System).

In these gaming machines, the player-information acquisition device is often provided on the periphery of the main display (for instance, in an area beside the main display) on which a game is executed. In this case, the gaming machine can improve the operability in loading the storage medium into the reading device. The gaming machine can also reduce the trouble with the player of visually recognizing the information displayed on the display device.

DISCLOSURE OF THE INVENTION

Problem to be Solved by the Invention

Conventionally, in the slant-type gaming machine, a display surface of a display is provided above the armrest. Meanwhile, installing larger displays has been a recent trend. As a result of this, gaming machines have inevitably become higher, blocking the front view of players thereat with their own height. Accordingly, it has been impossible for the players thereat to see their surroundings. In addition, the players thereat have had feelings of pressure from gaming machines in front of them.

The storage medium used for the player-information acquisition device may be used with a strap, a chain, etc. being attached thereto. In other words, through connecting the storage medium to the player himself/herself using the strap or the chain, the player can prevent the storage medium from being lost or stolen. The strap or the chain can also prevent the player from leaving the storage medium behind in the reading device. However, in this case, the strap or the chain sometimes hampers the player's operation for executing a game.

The object of the present invention is to provide a gaming machine with the reduced height compared with the conventional gaming machines without reducing the size of displays, being capable of expanding the player's visual range, and precluding the feelings of pressure from the machine on the player thereat.

Means for Solving the Problem

Therefore, in order to achieve the above object, according to a gaming machine of the invention encompassing one or more aspects thereof, there is provided a gaming machine. A gaming machine comprises a cabinet; a display provided in the cabinet and including a display surface for displaying information with respect to a game; a frontward protruding portion projected frontward of the gaming machine from a lower end of the display provided in the cabinet; and a human contact portion provided in the frontward protruding portion and having contact with a part of a player's body. The lower end of the display surface is positioned lower than the human contact portion. Thus, the height of this gaming machine can be reduced compared with the conventional gaming machines without reducing the size of the displays. Accordingly, the player's visual range can be made larger, precluding the feelings of pressure from the gaming machine on the player thereat.

A gaming machine related to one or more aspect of invention has a constitution described hereinafter. More specifically, the gaming machine has a connecting surface connecting an end portion of the human contact portion of a cabinet side with the lower end of the display. The connecting surface comprises a raised portion on an upper face thereof. The raised portion is formed in a curved shape being parallel with respect to a width direction of the gaming machine. A circular portion of the raised portion faces the human contact portion. Thus, if a foreign object such as a coin, dust or the like falls from the human contact portions onto the display, the foreign object is stopped by these raised portions. Accordingly, the player or the staff can easily collect the coin or dust which has fallen from the human contact portions. Also, if liquid such as drinking water or the like which is placed on the human contact portions falls from the human contact portions onto the display, the liquid which has fallen is temporarily stopped by the raised portions. Then, the liquid flows to the side of the gaming machine along the arc-like shape of the steps. Thus, it is possible to prevent the liquid from entering inside the cabinet.

The present invention has been conceived in view of the above circumstance and its object is to provide a gaming machine comprising: a cabinet housing therein a control board, the control board comprising a processor configured to execute control with respect to a game; an armrest protruding frontward from a front face of the cabinet; a player-information acquisition device provided in a front face of the armrest, comprising: a reading device wherein: a storage medium is attachable thereto, the storage medium configured to store information concerning a player with respect to a game, and the reading device reads the information from the storage medium; an operation unit provided closer to the cabinet than the player-information acquisition device is, the operation unit configured to transmit a signal to the processor.

The gaming machine has a player-information acquisition device provided on the front face of the armrest. The operation unit is provided closer to the cabinet than the player-information acquisition device is. Accordingly, a player carries out operations to the operation unit while putting his/her forearm(s) on the armrest. To be specific, when a storage medium is tied to a player's body with a strap, the strap is positioned closer to the player's body than the player's hands operating the operation unit are. As a result, even when the storage medium is loaded in the player-information acquisition device, the player can execute operations with respect to a game without being hampered by the strap etc. More specifically, the gaming machine can offer a player an environment in which the player can concentrate on the game better. The player-information acquisition device is provided on the front face of the armrest. Accordingly, the gaming machine can offer the convenience of the easiness in the loading operation of the storage medium.

BEST MODE FOR CARRYING OUT THE INVENTION

First Embodiment

Figure 1:
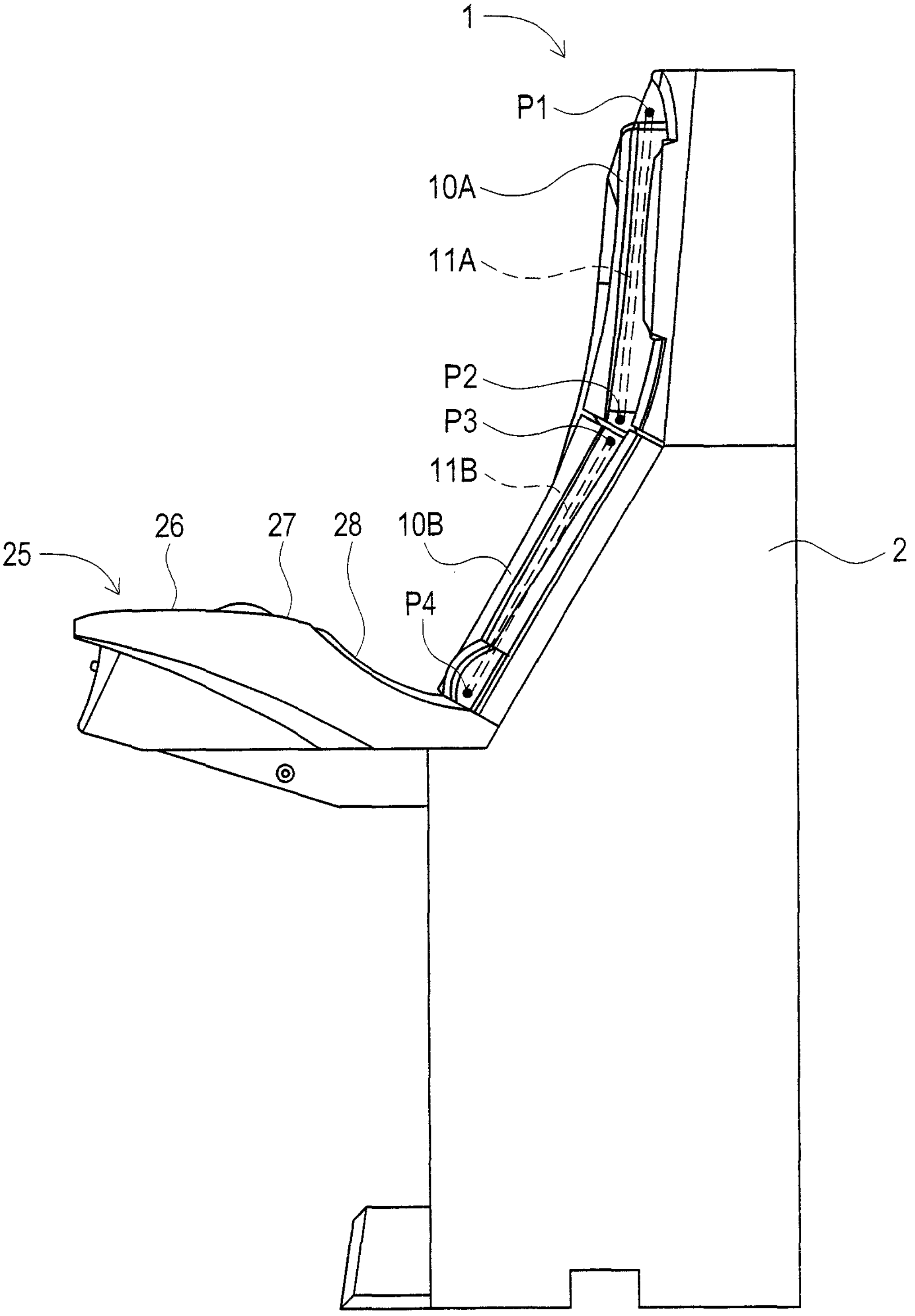
FIG. 1 is a side view showing an outer appearance of a slot machine according to the first embodiment of the present invention.

A gaming machine according to the first embodiment will be described in detail while referring to the drawings as embodied in a slot machine. Here, the slot machine according to the following first embodiment is a slanted-type slot machine at which a player plays while sitting on a seat placed in front of the slot machine.

The slot machine 1 according to the present invention has two displays (an upper display 10A and a main display 10B) provided one above the other at a position from a middle to an upper portion of a cabinet 2. The upper display 10A and the main display 10B display information (symbols, effect images, credit information, help screen or the like) with respect to the game to be executed in that slot machine 1 on their respective display surfaces.

The slot machine 1 according to the present invention has a frontward projecting portion 25 which is projected from the lower end of the main display 10B provided in the cabinet 2 to frontward (leftward in FIG. 1) of the slot machine 1. The frontward projecting portion 25 has an armrest 26, a control panel 27, etc., each of which serves as a human contact portion which comes in contact with a part of the player's body.

As shown in FIG. 1, the slot machine 1 according to the first embodiment has a characteristic feature in that the lower end P4 of the display surface 11B in the main display 10B is positioned lower than the human contact portions (armrest 26 and control panel 27).

Figure 2:
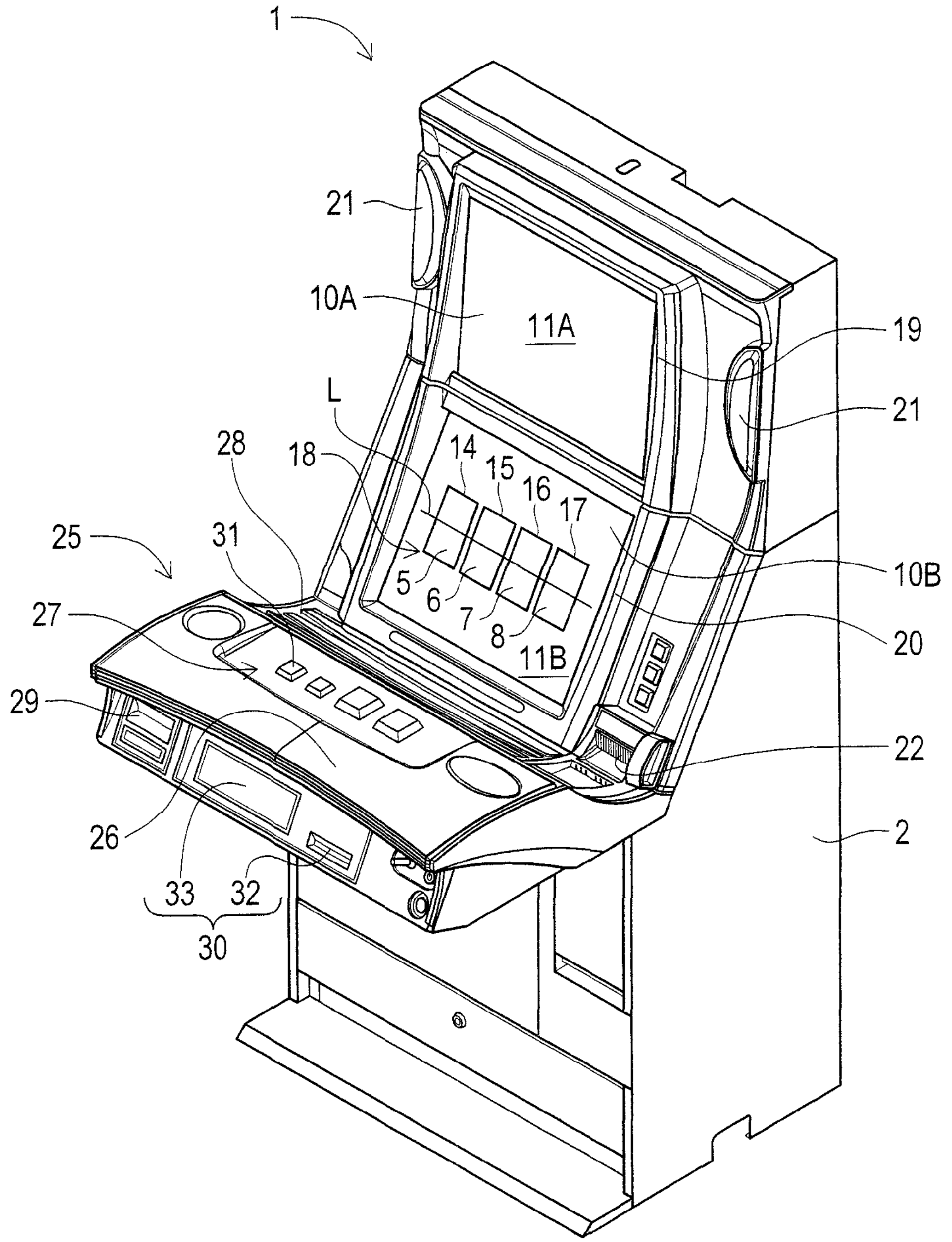
FIG. 2 is a perspective view showing an outer appearance of the slot machine according to the first embodiment of the present invention.
Figure 3:
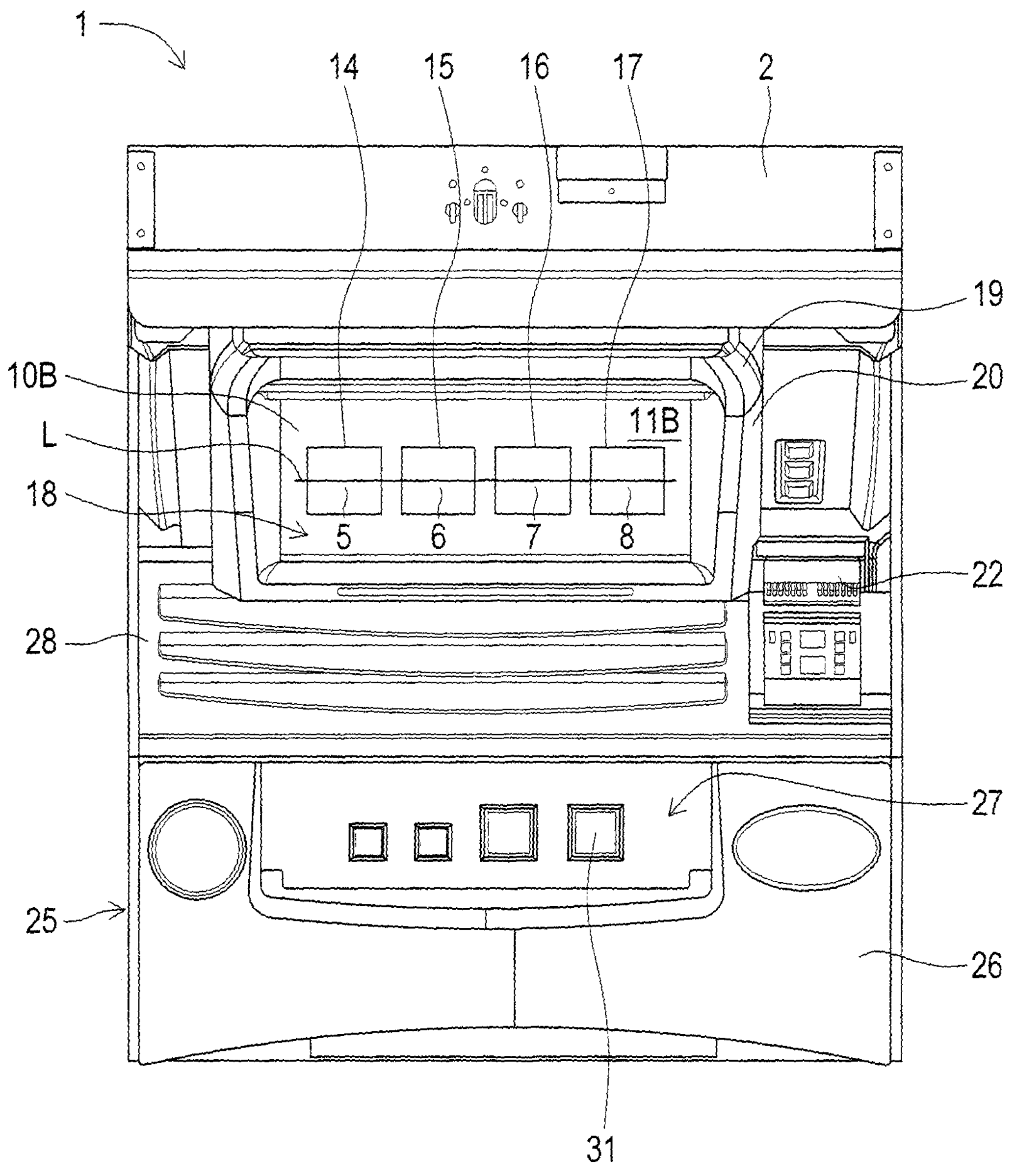
FIG. 3 is a top view showing an outer appearance of the slot machine according to the first embodiment of the present invention.

Next, the slot machine 1 according to the first embodiment will be described in detail while referring to the drawings. FIG. 2 is a perspective view showing an outer appearance of the slot machine 1 according to the first embodiment. FIG. 3 is a top view showing an outer appearance of the slot machine 1 according to the first embodiment.

As shown in FIG. 2 and FIG. 3, the slot machine 1 has a cabinet 2. The cabinet 2 houses electrical and mechanical components for executing a predetermined game aspect in the slot machine 1. Four reels (specifically, a first reel 5, a second reel 6, a third reel 7 and a fourth reel 8) are provided inside the cabinet 2 in a freely rotating fashion. The first reel 5 through the fourth reel 8 each have a symbol string drawn on an outer peripheral surface thereof. Each symbol string is made up of a predetermined number of symbols. Also, each symbol string includes a plurality of types of symbols.

The cabinet 2 has the upper display 10A and the main display 10B provided at a front face thereof. The upper display 10A is provided at a front upper portion of the cabinet 2. The upper display 10A is made up of a heretofore known liquid crystal panel. The upper display 10A displays information with respect to a game on the display surface 11A. The display contents to be displayed on the upper display 10A include effect images, introduction of the game contents, game rule explanations and the like.

The main display 10B is provided at a front middle portion of the cabinet 2. The main display 10B is made up of a heretofore known transparent liquid crystal panel or the like. The main display 10B displays information with respect to a game on the display surface 11B. The display contents to be displayed on the main display 10B include effect images, contents of the acquired prize, bet amount and the credit amount possessed by the player and the like. Specifically, the player progresses a game in the slot machine 1 based on the display of the upper display 10A and the main display 10B.

The main display 10B has a first display window 14, a second display window 15, a third display window 16 and a fourth display window 17. As described earlier, the first reel 5 through the fourth reel 8 are provided inside the cabinet 2. The main display 10B is positioned in front of the first reel 5 through the fourth reel 8. In the main display 10B, the first display window 14 through the fourth display window 17 are formed at portions corresponding to the first reel 5 through the fourth reel 8. For instance, the first display window 14 is formed at a position corresponding to the front of the first reel 5 of the main display 10B. In the slot machine 1, the inner side of the first display window 14 through the fourth display window 17 can be changed to a transparent state. This enables players to view a back of the main display 10B through the first display window 14 through the fourth display window 17.

Specifically, the players can see the symbols drawn on the first reel 5 through the fourth reel 8 through the first display window 14 through the fourth display window 17.

The main display 10B displays one pay line L. The pay line L crosses the center of the first display window 14 through the fourth display window 17 in a horizontal fashion. The pay line L defines a symbol combination constituting the game results. Accordingly, if the symbol combination which has been repositioned on the pay line L is a predetermined winning combination, the slot machine 1 awards a payout in accordance with this combination and the credit amount (bet amount) thus bet.

In the present invention, the number of reels is not limited to four reels. Specifically, the number of reels in the slot machine 1 can be changed to a different number.

Further, a touch panel 18 is provided at a front face of the main display 10B. Accordingly, the player can operate the touch panel 18 to input various types of commands. For instance, the players can select a desired selection from a plurality of selections which are displayed on the main display 10B, by pressing the touch panel 18 with a finger.

A luminescent device which is not illustrated is provided inside an upper frame 19 formed at a peripheral edge of the upper display 10A. A similar luminescent device which is not illustrated is provided inside a lower frame 20 formed at a peripheral edge of the main display 10B. These luminescent devices light up in a predetermined lighting fashion in case predetermined conditions (for instance, at the time of winning) are satisfied.

Speakers 21 are provided at a front face of the cabinet 2. Speakers 21 are provided as a pair at a right side and left side of the upper frame 19. Speakers 21 output sound in accordance with the progress of the game.

A bill slot 22 is formed at a front face of the cabinet 2. The bill slot 22 is adapted to accept bills inside the cabinet 2. At the slot machine 1, the player can insert a predetermined ticket in the bill slot 22. Such a ticket is outputted from the ticket printer 29 as will be described later. This ticket includes information with respect to the amount of gaming values awarded to the player based on the game results. Specifically, the slot machine 1 can identify the amount of gaming values which can be used in the game based on the gaming value amount information included in such a ticket.

In the slot machine 1 according to the first embodiment, bills, tickets or electronic valuable information (credits) corresponding to these can be used as gaming values. The gaming values applicable to this invention are not limited to these. For instance, coins, medals, tokens, electronic money, tickets or the like can also be employed.

The slot machine 1 has a frontward projecting portion 25 which is projected from the lower end of the main display 10B provided in the cabinet 2 to frontward (leftward in FIG. 1) of the slot machine 1. The frontward projecting portion 25 has an armrest 26, a control panel 27, a connecting surface 28, a ticket printer 29, a player information display device 30 and a woofer (not shown).

The armrest 26 is a human contact portion which comes in contact with a player's arm or elbow when the player operates the operation buttons provided on the control panel 27. The armrest 26 is provided at a periphery of the control panel 27 on an upper surface of the frontward projecting portion 25. A player who sits in front of the slot machine 1 can thus play a game while resting his/her arm or elbow on the armrest 26.

The control panel 27 is made up of a plurality of operation buttons 31. The plurality of operation buttons 31 include a BET button, a COLLECT button, a START button, a CASH-OUT button and the like. The control panel 27 is used by the player to carry out operations in the game. The control panel 27 represents a human contact portion which comes in contact with a player's hand when he/she operates the operation buttons provided on the control panel 27.

A connecting surface 28 is a member which connects the cabinet-side ends of the arm rest 26 and the control panel 27 to the lower end of the main display 10B, covering the upper surface of the frontward projecting portion 25. The connecting surface 28 will be described in detail later while referring to the drawings.

The ticket printer 29 prints information showing the amount of gaming values on a sheet of paper and then discharges the printed sheet. After the game has ended, the ticket printer 29 prints the amount of gaming values that the player possesses on a sheet of paper and then discharges the printed sheet as a ticket.

The player information display device 30 has a card reader 32, an information display 33 and a control device and the like which is not illustrated. The player information display device 30 reads this player information from the player card which stores player information. Then, the player information display device 30 displays the player information thus read out on the information display 33. Thus, the player information display device 30 notifies the corresponding player information (for instance, history of game results for this player) to the player.

The woofer is provided inside the frontward projecting portion 25, with the sound output direction facing downward. The woofer is a speaker specialized in low-pitched sound output.

Figure 4:
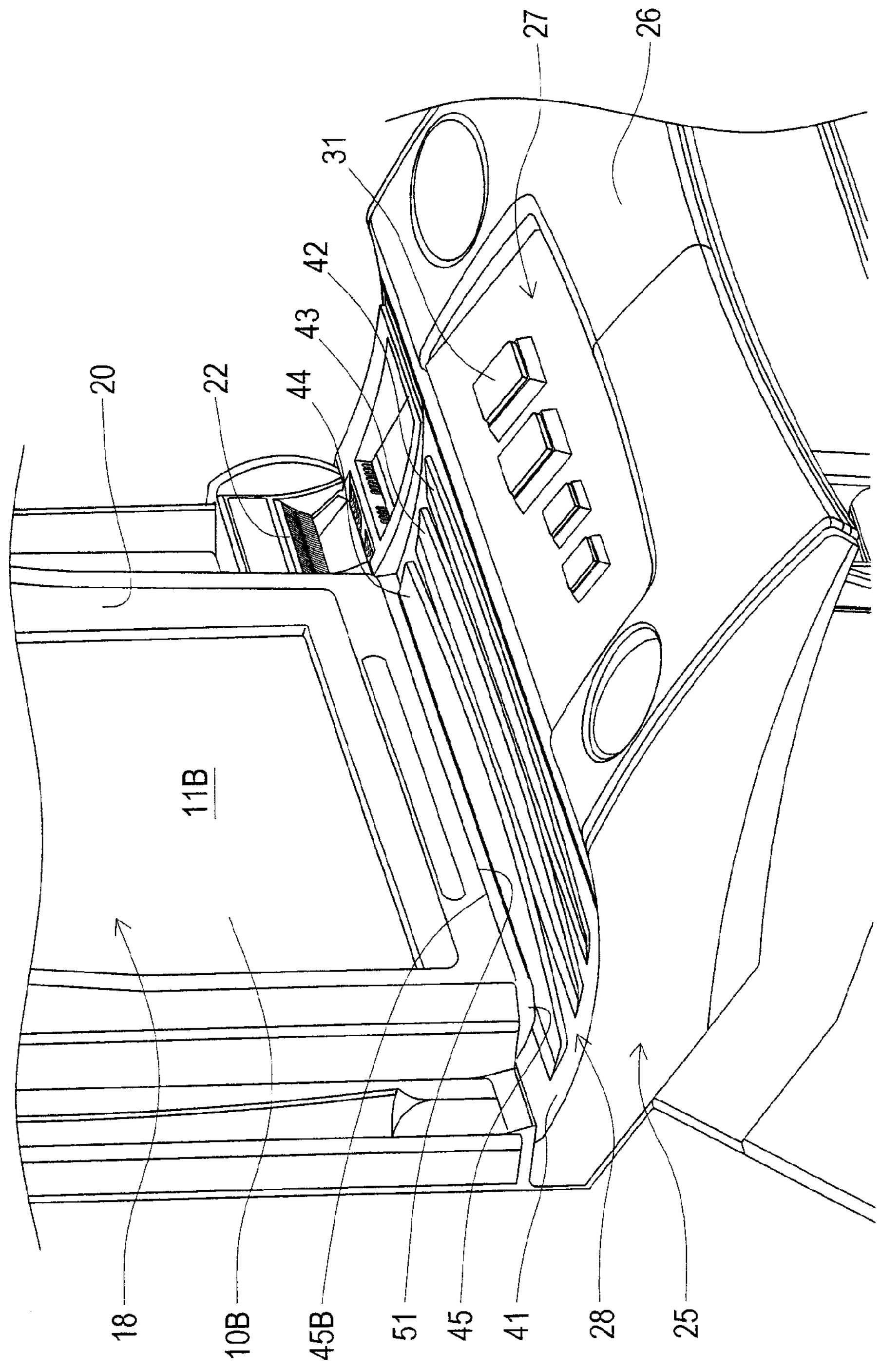
FIG. 4 is an enlarged perspective view showing a connecting surface of the slot machine and the vicinity thereof according to the first embodiment of the present invention.
Figure 5:
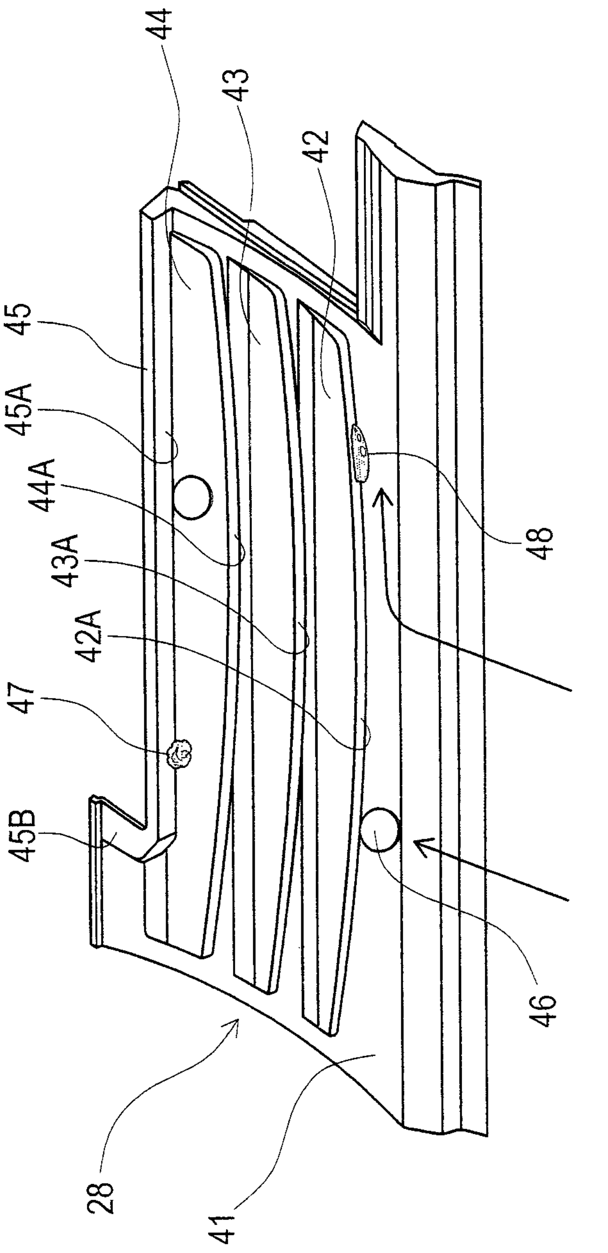
FIG. 5 is a perspective view showing the connecting surface in the slot machine according to the first embodiment of the present invention.
Figure 6:
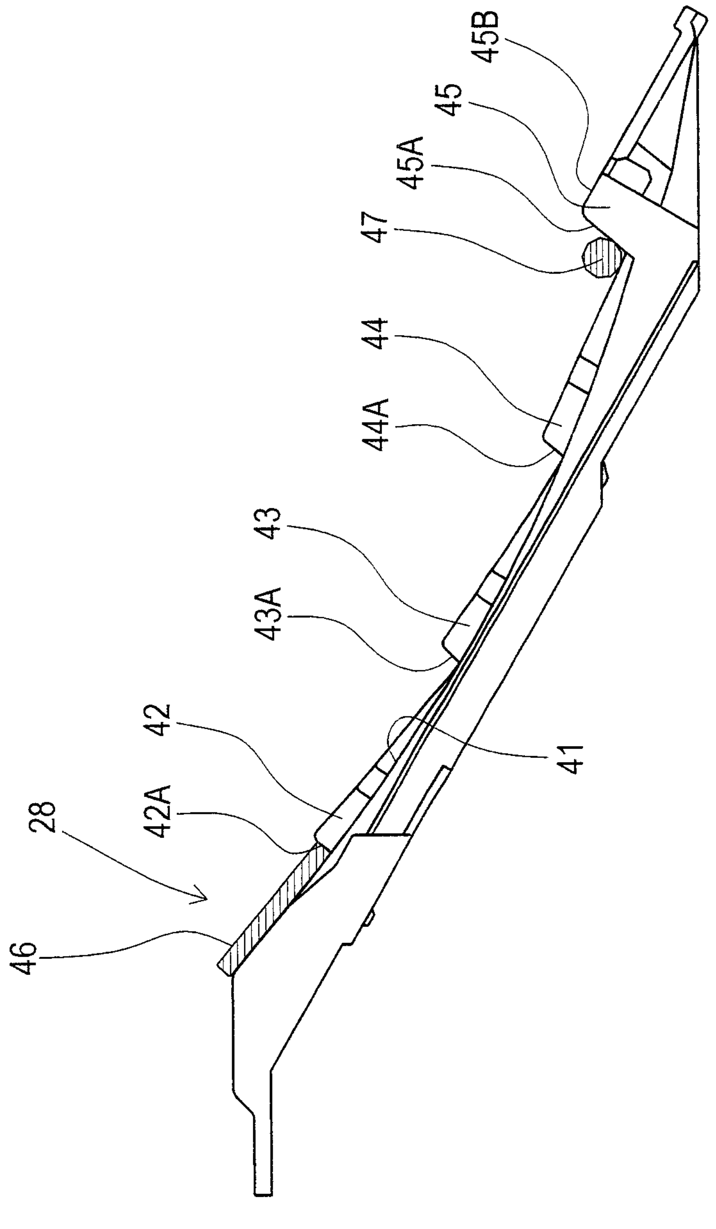
FIG. 6 is a side view showing the connecting surface in the slot machine according to the first embodiment of the present invention.

Next, the connecting surface 28 provided in the frontward projecting portion 25 will be described in detail based on FIG. 4 through FIG. 6. FIG. 4 is an enlarged perspective view showing the connecting surface of the slot machine and the vicinity thereof according to the first embodiment. FIG. 5 is a perspective view showing the connecting surface according to the first embodiment. FIG. 6 is a side view showing the connecting surface according to the first embodiment.

The connecting surface 28 is a member which connects the cabinet-side ends of the arm rest 26 and the control panel 27 to the lower end of the main display 10B.

As shown in FIG. 5, the connecting surface 28 is made up of a plate-like member having a rectangular shape. The connecting surface 28 is provided between the armrest 26 and the control panel 27 in a united form and the lower end of the main display 10B, with respect to the upper surface of the frontward projecting portion 25. As shown in FIG. 6, the connecting surface 28 provided in the frontward projecting portion 25 is slanted downward in a depth direction (rightward direction in FIG. 6) of the slot machine 1. Specifically, the lower end of the display surface 11B in the main display 10B is provided downward below the armrest 26 and the control panel 27 which serve as human contact portions.

As shown in FIG. 5 and FIG. 6, the connecting surface 28 is curved down so that a central portion thereof in a depth direction of the slot machine 1 is positioned lower than the edge portions thereof in a depth direction. The upper surface 41 of the curved connecting surface 28 has three raised portions 42 through 44 and a protruding wall 45 formed thereon.

Here, the raised portions 42 through 44 are each formed in a curved shape parallel with respect to a width direction of the slot machine 1. The raised portions 42 through 44 are respectively arranged next to each other in a depth direction of the slot machine 1. The arc-like portions of the raised portions 42 through 44 face the armrest 26 and the control panel 27. As shown in FIG. 6, the arc-like portions of the raised portions 42 through 44 form steps 42A through 44A on the upper surface 41 of the connecting surface 28.

Here, the connecting surface 28 as described above is slanted downward with respect to a depth direction of the slot machine 1. Accordingly, when a coin 46 or dust 47 placed on the armrest 26 or control panel 27 falls from the armrest 26 or the control panel 27 in a depth direction of the slot machine 1, the coin 46 or the dust 47 are to slip on the upper surface 41 of the connecting surface 28, moving towards the main display 10B. However, as steps 42A through 44A are formed on the upper surface 41 of the connecting surface 28, the coin 46 or the dust 47 is stopped from falling by any of the steps 42A through 44A, as shown in FIG. 5 and FIG. 6. This enables a player or staff to easily collect the coin 46 or the dust 47 dropped from the armrest 26 and the control panel 27.

Meanwhile, if liquid 48 such as drinking water or the like placed on the armrest 26 or the control panel 27 falls from the armrest 26 or the control panel 27 in a depth direction of the slot machine 1, the liquid which has fallen as shown in FIG. 5 is temporarily stopped at the steps 42A through 44A. Then, the liquid flows to the side of the slot machine 1 along the arc-like shape of the steps 42A through 44A. Thus, the liquid 48 can be prevented from entering inside the cabinet 2.

Incidentally, the protruding wall 45 is a wall-shaped member formed so as to protrude upward from the upper surface 41 of the connecting surface 28. The protruding wall 45 is formed along the edge portion facing the lower end of the main display 10B. As shown in FIG. 4, the lower end surface 51 of the main display 10B is provided in the cabinet 2 while being in contact with the upper surface 45B of the protruding wall 45. Specifically, a clearance which is formed between the main display 10B and the frontward projecting portion 25 is covered by the protruding wall 45.

Accordingly, even if a coin 46, dust 47 or liquid 48 which has fallen from the armrest 26 or the control panel 27 passes over the steps 42A through 44A of the connecting surface 28 and moves in the direction of the main display 10B, the coin 46, the dust 47 or the liquid 48 is stopped from moving while being in contact with the side surface 45A of the protruding wall 45 before reaching the protruding wall 45, as shown in FIG. 5 and FIG. 6. Thus, a coin 46, dust 47 or liquid 48 never enters the clearance formed between the main display 10B and the frontward projecting portion 25.

Figure 7:
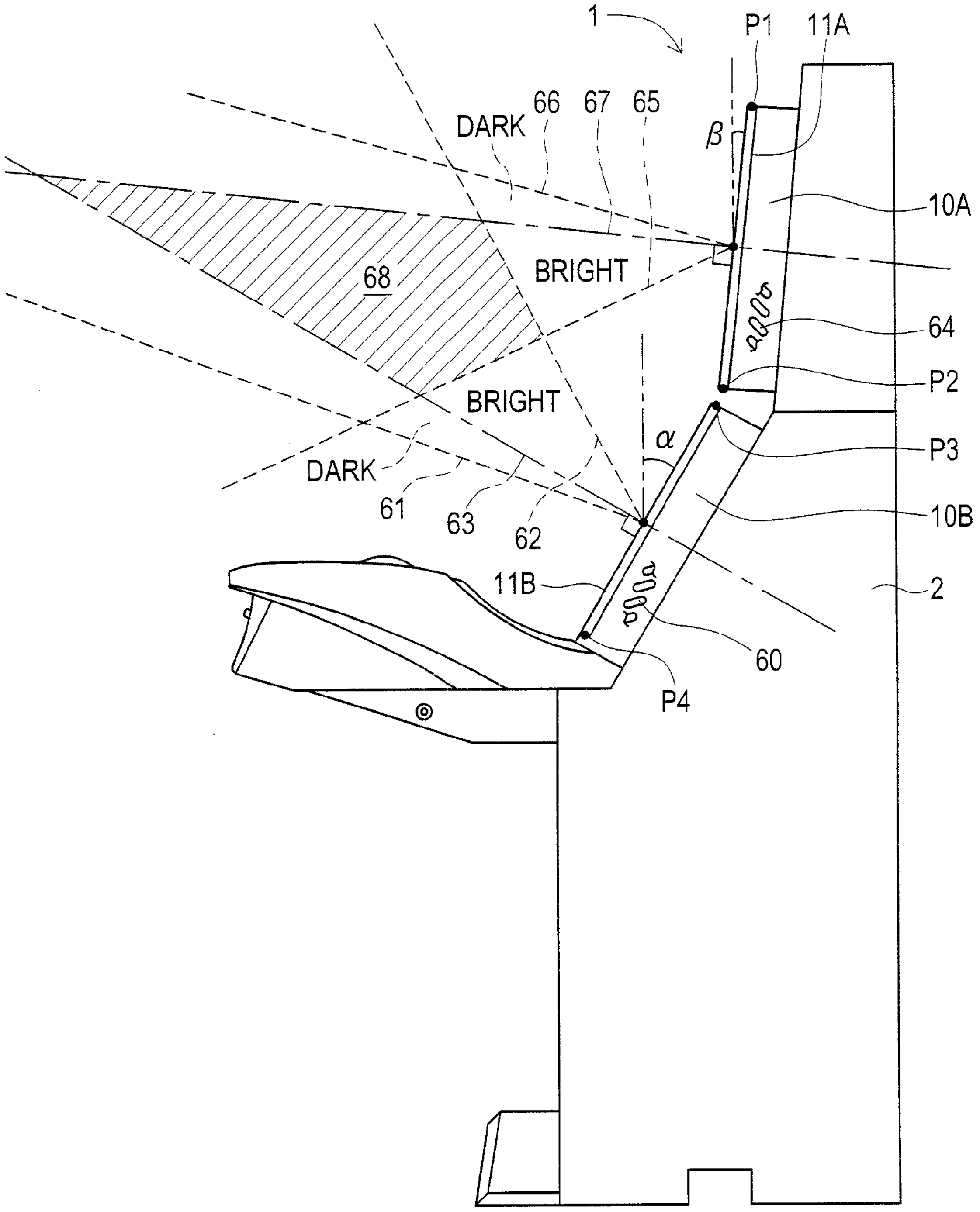
FIG. 7 is a view showing an arrangement pattern for displays in the slot machine according to the first embodiment of the present invention.

An arrangement pattern of the upper display 10A and the main display 10B in the slot machine 1 according to the first embodiment will be described in detail by referring to FIG. 7. FIG. 7 is a side view of a slot machine according to the first embodiment. FIG. 7 shows the cabinet 2 with the upper frame 19 and the lower frame 20 removed therefrom.

The main display 10B is provided in the cabinet 2 in a slanted fashion so that the lower end P2 of the display surface 11B is positioned further frontward (leftward in FIG. 7) than the upper end P1 thereof with reference to the slot machine 1, as shown in FIG. 7. Specifically, the display surface 11B is provided at a position corresponding to an a inclination angle with respect to a vertical direction.

Meanwhile, the upper display 10A is provided in the cabinet 2 in a slanted fashion so that the lower end P4 of the display surface 11A is positioned further frontward (leftward in FIG. 7) than the upper end P3 thereof with reference to the slot machine. More specifically, the display surface 11A is provided at a position corresponding to a β inclination angle with respect to a vertical direction. Angle β is smaller than angle α. Specifically, the display surface 11B of the main display 10B is provided at a larger inclination angle with respect to the vertical direction than the display surface 11A of the upper display 10A.

The upper display 10A and the main display 10B are provided in the cabinet 2 in a fashion taking into consideration the slanted direction of the liquid crystal molecules 60 which become slanted when voltage is applied thereto.

For instance, the main display 10B is placed in the cabinet 2 in a fashion that a slanted direction of the liquid crystal molecules 60 which are configured to become slanted when voltage is applied thereto is provided so that lower ends of the liquid crystal molecules 60 are positioned more frontward than the upper ends thereof.

Here, if the liquid crystal molecules are arranged on a slant with respect to the display surface, generally, the screen of the liquid crystal display appears bright when viewed on a slant from a position forming a right angle with the slanted direction of the liquid crystal molecules. On the other hand, it is widely known that the screen of the liquid crystal display appears dark when viewed on a slant from a direction which is parallel with the slanted direction of the liquid crystal molecules.

Accordingly, if the main display 10B is provided in the cabinet 2 with the liquid crystal molecules 60 being in a slanted direction when voltage is applied thereto so that the lower ends of the liquid crystal molecules 60 are positioned more frontward than the upper ends thereof, the display surface of the main display 10B appears bright when viewed from an upward position on a slant, as shown in FIG. 7. On the other hand, the display surface of the main display 10B appears dark when viewed from a downward position on a slant. Specifically, when a viewing angle of the main display 10B corresponds to the angle between the line 61 and line 62, the range from the line 61 to a perpendicular line 63 of the display surface 11B is equal to the viewing angle range where the images displayed on the display surface 11B appear dark. Also, the range from the line 62 to the perpendicular line 63 of the display surface 11B corresponds to the viewing angle range where the images displayed on the display surface 11B appear bright.

Meanwhile, the upper display 10A is provided in the cabinet 2 with the liquid crystal molecules 64 being slanted when voltage is applied thereto so that upper ends of the liquid crystal molecules 64 are positioned more frontward than lower ends thereof.

Accordingly, the display surface of the upper display 10A appears bright when viewed from a downward position on a slant, as shown in FIG. 7. On the other hand, the display surface of the upper display 10A appears dark when viewed from an upward position on a slant. Specifically, when a viewing angle of the upper display 10A corresponds to the angle between the line 65 and line 66, the range from the line 65 to a perpendicular line 67 of the display surface 11A corresponds to the viewing angle range where the images displayed on the display surface 11A appear bright. Also, the range from the line 66 to the perpendicular line 67 of the display surface 11A corresponds to the viewing angle range where the images displayed on the display surface 11A appear dark.

Thus, as seen in FIG. 7, in the slot machine 1 according to the first embodiment, the viewing angle range from where the images displayed on the upper display 10A appear bright and the viewing angle range from where images displayed on the main display 10B appear bright overlap each other. As a result, an area 68 is formed wherein both displays appear bright. This area 68 is formed between the upper display 10A and the main display 10B, in the vicinity of an upper portion of the armrest 26. The position of this area 68 coincides with the position of the player's head. Accordingly, both display screens appear bright to the player.

Figure 8:
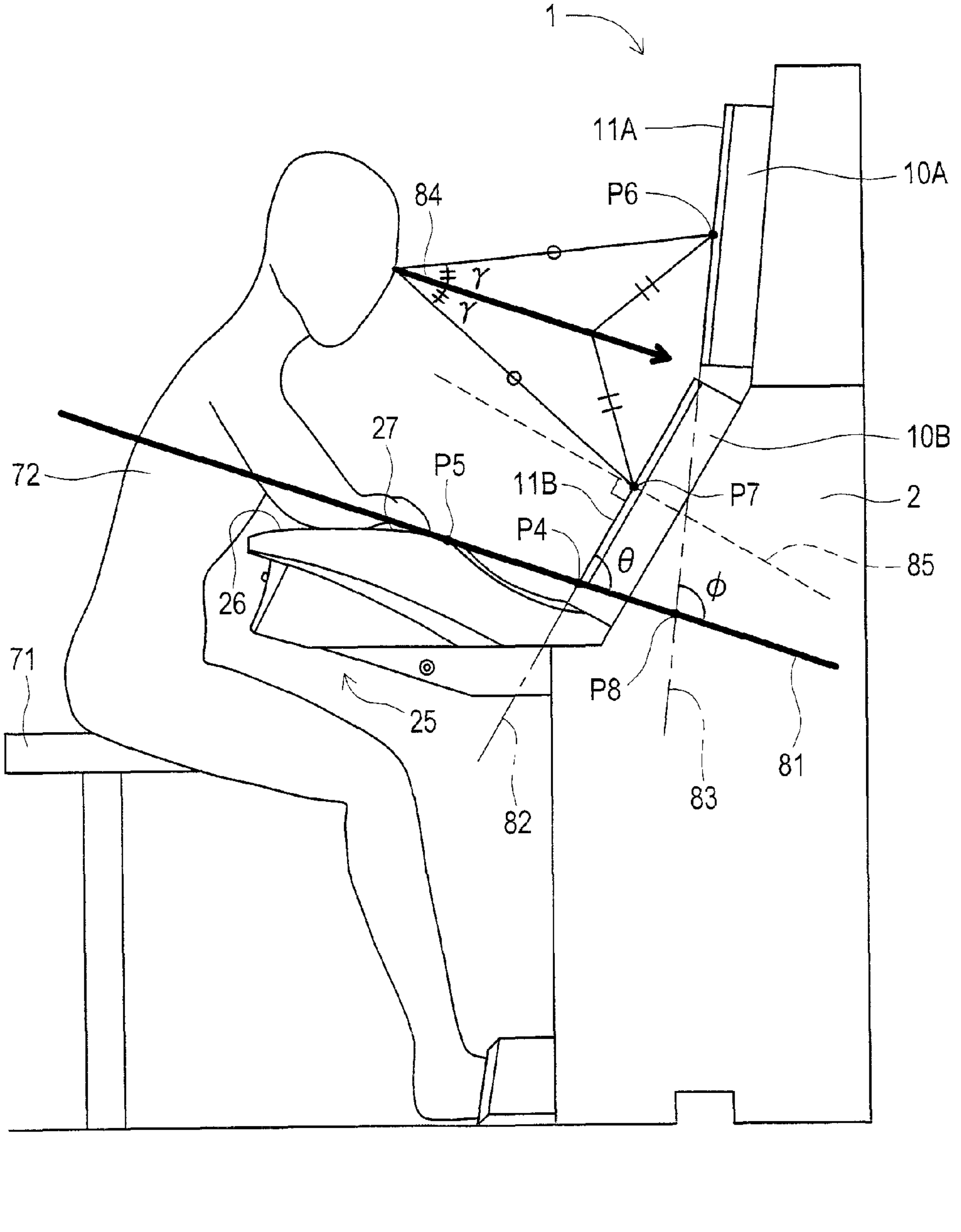
FIG. 8 is a view showing a positioning relationship between human contact portions and displays in a slot machine according to the first embodiment of the present invention.

Next, the arrangement pattern of the upper display 10A and the main display 10B in the slot machine 1 according to the first embodiment will be described by referring to their relative positioning relationship with the human contact portions (armrest 26 or control panel 27). FIG. 8 is a side view showing a slot machine and a player according to the first embodiment. FIG. 8 shows the cabinet 2 with the upper frame 19 and the lower frame 20 removed therefrom.

As shown in FIG. 8, when a player 72 sits on a seat 71 to play a game, he/she can rest his/her arm or hand on the armrest 26 or the control panel 27 when executing the game. Specifically, as shown in the example in FIG. 8, the armrest 26 and the control panel 27 serve as human contact portions which comes into contact with a part of the player's body.

In the following description, a first straight line 81 defines a line which connects an end portion P5 on the cabinet-side of the human contact portions (armrest 26 and control panel 27) with the lower end P4 of the display surface 11B of the main display 10B, on a vertical section which is perpendicular with respect to a width direction of the slot machine 1. On the same vertical section, a second straight line 82 defines a line which runs along the display surface 11B of the main display 10B. Further, a third straight line 83 defines a line which runs along the display surface 11A of the upper display 10A, on the same vertical section. Also, a fourth straight line 84 defines a straight line corresponding to bisector of an angle between two line segments; namely, a segment connecting a position of the player's eyes and a central point P6 in the display surface 11A of the upper display 10A and a segment connecting the position of the player's eyes and a central point P7 of the display surface 11B of the main display 10B, on the same vertical section. Furthermore, on the same vertical section, a fifth straight line 85 defines a straight line which passes through the central point P7 of the display surface 11B in the main display 10B in a perpendicular direction with respect to the display surface 11B.

In the slot machine 1 according to the first embodiment, the lower end P4 of the display surface 11B in the main display 10B is positioned lower than the human contact portions (armrest 26 and control panel 27).

A half line backward in the cabinet of the first straight line 81, originating from an intersection point P4 of the first straight line 81 and the second straight line 82 (a right-side half line originating from P4 in FIG. 8), and a half line on the main display 10B side of the second straight line 82, originating from the intersection point P4 (an upper-side half line originating from P4 in FIG. 8), form a θ angle. The θ angle is an acute angle (θ<90°.

A half line backward in the cabinet of the first straight line 81, originating from an intersection point P8 of the first straight line 81 and the third straight line 83 (a right-side half line originating from P8 in FIG. 8), and a half line on the upper display 10A side of the third straight line 83, originating from the intersection point P8 side (an upper-side half line originating from P8 in FIG. 8), form a ϕ angle. The ϕ angle is an obtuse angle (θ>90°).

The fourth straight line 84 is parallel with the first straight line 81. The fourth straight line 84 passes through a position corresponding to the eyes of a player 72 of an average height (for instance, 173 cm). In the slot machine 1 according to the first embodiment, the human contact portions and the respective displays are arranged so that the first straight line 81 becomes parallel with the normal line of sight at the time the player 72 of an average height plays a game in the slot machine 1. Accordingly, the fourth straight line 84 coincides with the line of sight of an average height player. Specifically, the display surface of the upper display 10A and that of the main display 10B each are provided at a position (specifically, a target position centered around the normal line of sight of the player 72) wherein the angles (in FIG. 8, angles γ) with respect to the normal line of sight of the player 72 are the same. FIG. 8 shows a player 72 of an average height playing a game.

The fifth straight line 85 and the first straight line 81 intersect further backward (right side in FIG. 8) in the cabinet 2 than the lower end P4 of the display surface 11B in the main display 10B.

The slot machine 1 according to the first embodiment as described above has an upper display 10A and a main display 10B. Here, the display surface 11B of the main display 10B is arranged at a larger inclination with respect to a vertical direction than the display surface 11A of the upper display 10A. Accordingly, the display surfaces of the plurality of displays which are provided in the gaming machine can be arranged at an inclination angle enabling the player to view easily. Also, the height of the slot machine 1 can be reduced, expanding a player's visual range.

The half line backward in the cabinet of the first straight line 81, originating from the intersection point P4 of the first straight line 81 and the second straight line 82, and the half line on the main display 10B side of the second straight line 82, originating from the intersection point P4 form an acute angle. Further, the half line backward in the cabinet of the first straight line 81, originating from the intersection point P8 of the first straight line 81 and the third straight line 83, and the half line on the upper display 10A side of the third straight line 83, originating from the intersection point P8, form an obtuse angle. If it is assumed that the first straight line 81 is parallel with the normal line of sight of the player, the display surface of the main display 10B can be positioned downward with respect to the normal line of sight of the player and the display surface of the upper display 10A can be positioned upward with respect to the normal line of sight of the player. As a result, a player can view the display surface of the upper display 10A and the display surface of the main display 10B with very little eye movement, reducing eye strain.

The fourth straight line 84 is parallel with the first straight line 81. Thus, if it is assumed that the first straight line 81 is parallel with the normal line of sight of the player, the display surface of the upper display 10A and that of the main display 10B each can be provided at a position (specifically, the target position centered around the normal line of sight of the player) where the angles with respect to the normal line of sight of the player are the same. Thus, the player can see the upper display 10A and the main display 10B with the same image quality. As the angle for the movement of the line of sight in the case the player looks at the upper display 10A is equal to the angle for the movement of the line of sight in the case the player looks at the main display 10B, the eye strain of a player who looks at a plurality of display surfaces can be reduced.

In the slot machine 1 according to the first embodiment, the lower end P4 of the display surface 11B in the main display 10B is positioned lower than the human contact portions (armrest 26 and control panel 27). As a result, the height of this gaming machine can be reduced compared with the conventional gaming machines without reducing the size of the displays. Accordingly, the player's visual range can be made larger, precluding the feelings of pressure from the gaming machine on the player thereat.

The fifth straight line and the first straight line intersect further backward in the cabinet 2 than the lower end P4 of the display surface 11B of the main display 10B. Thus, the human contact portions do not obstruct the player's visual range when he/she looks at the display surface 11B. Accordingly, an excellent visual range can be ensured for the player with respect to the display surface 11B.

Three raised portions 42 through 44 are formed on the upper surface 41 of the connecting surface 28. The raised portions 42 through 44 are each formed in a curved shape parallel with respect to a width direction of the slot machine 1. The arc-like portions of the raised portions 42 through 44 face the armrest 26 and the control panel 27. Thus, if a foreign object such as a coin, dust or the like falls from the human contact portions onto the display, the foreign object is stopped by these raised portions. Accordingly, the player or the staff can easily collect the coin or the dust which has fallen from the human contact portions. Also, if liquid such as drinking water or the like which is placed on the human contact portions falls from the human contact portions onto the display, the liquid which has fallen is temporarily stopped by the raised portions 42 through 44. Then, the liquid flows to the side of the gaming machine along the arc-like shape of the steps 42A through 44A. Thus, the liquid can be prevented from entering inside the cabinet.

The present invention is not limited to the above-described embodiment, and it is obvious that various improvements and modifications can be made thereto without departing from the spirit of the present invention.

Figure 9:
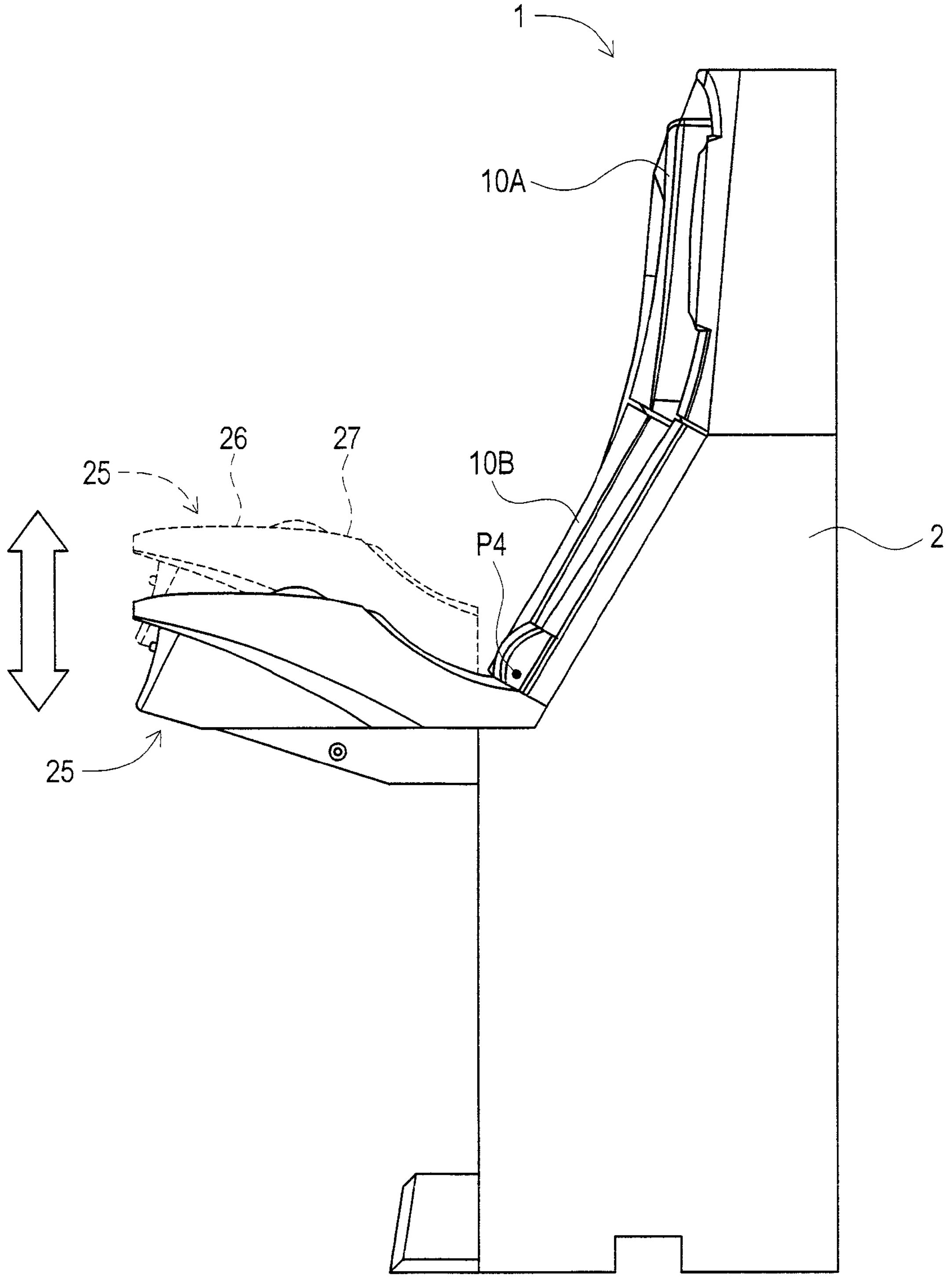
FIG. 9 is a side view showing an outer appearance of a slot machine according to another embodiment of the present invention.

For instance, the slot machine 1 may also have a moving device for allowing the frontward projecting portion 25 to move up and down with respect to the cabinet 2. For instance, when a player operates the operation buttons provided in the control panel 27, the frontward projecting portion 25 may move upward or downward in response to the player's operation. With the above-described configuration, the human contact portions (armrest 26 or control panel 27) provided in the frontward projecting portion 25 as shown in FIG. 9 may be movable in an upward and downward direction with respect to the cabinet 2. As a result, the human contact portions (armrest 26 and control panel 27) can be provided at a position in accordance with the player's body frame. The slot machine 1 may detect the player's body frame using a sensor, and the frontward projecting portion 25 may be automatically moved to a position in accordance with the player's body frame as detected.

Preferably, the frontward projecting portion 25 may be allowed to move within a range wherein the human contact portions (armrest 26 or control panel 27) are positioned higher than the lower end P4 of the display surface in the main display 10B.

The frontward projecting portion 25 may be allowed to move pivotally with respect to the cabinet 2 so that the human contact portions (armrest 26 and control panel 27) may be movable upward and downward.

The slot machine 1 according to the first embodiment has the armrest 26 and the control panel 27 serving as the human contact portions. But, the slot machine 1 may have a coin slot formed on the frontward projecting portion 25 as the human contact portions in place of the armrest 26 and the control panel 27.

A first straight line 81 may define a line which connects a point which comes in contact with a player's elbow, in the human contact portions (armrest 26 and control panel 27), with the lower end P4 of the display surface 11B in the main display 10B, on a vertical section perpendicular with respect to the width direction of the slot machine 1.

Second Embodiment

A gaming machine according to the second embodiment will be described in detail with reference to the drawings as embodied in a slot machine 101.

The features of the slot machine 101 according to the second embodiment will be described in detail with reference to the drawings. The slot machine 101 according to the second embodiment is a so-called hybrid-type slot machine. This hybrid-type slot machine has a known transparent liquid crystal panel provided in front of a plurality of mechanical reels. The plurality of mechanical reels are rotatably supported. This hybrid-type slot machine turns the transparent liquid crystal panel into a transparent state when executing a game so as to allow the images of various symbols depicted on the outer peripheral surfaces of the mechanical reels to be displayed.

Figure 10:
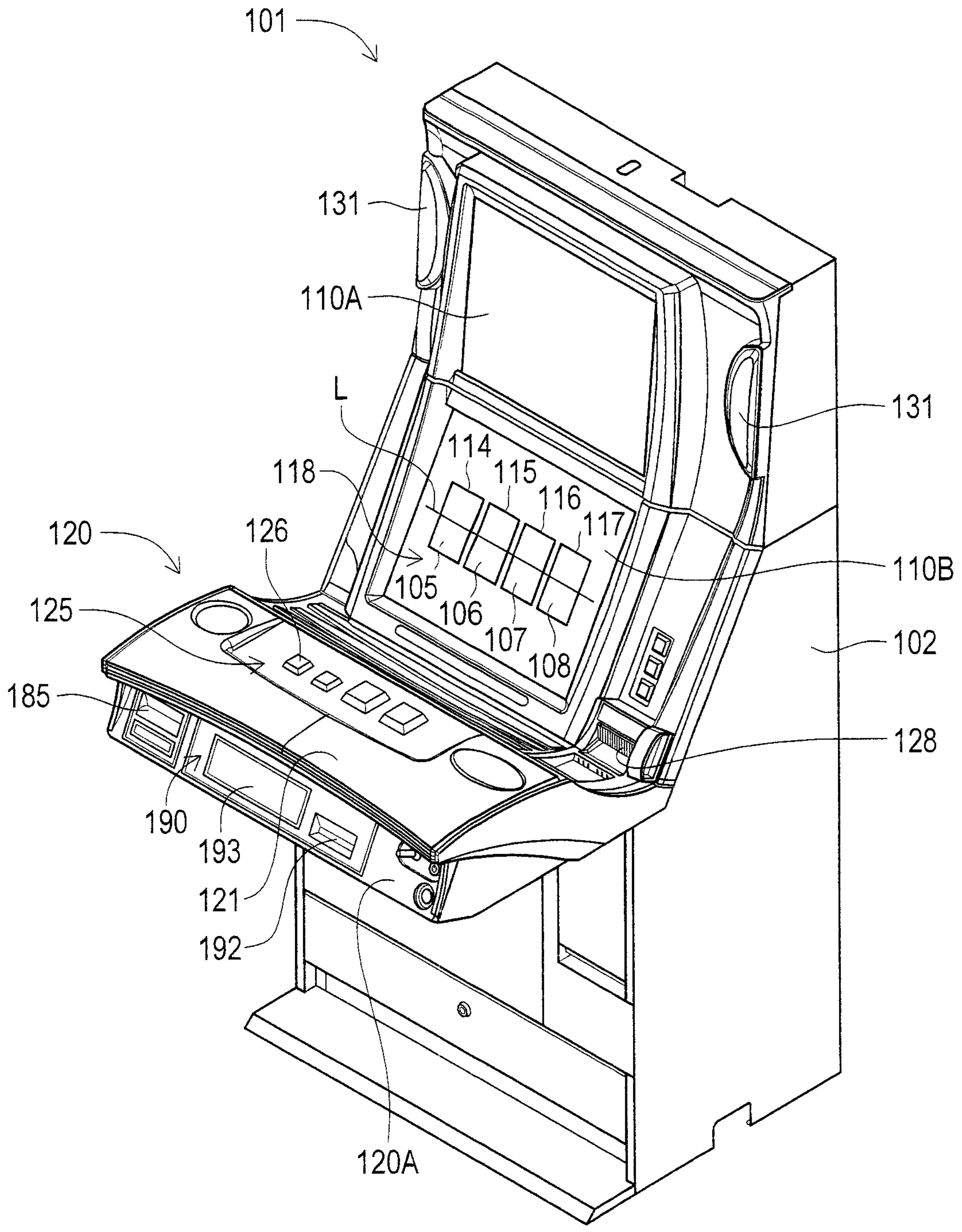
FIG. 10 is an explanatory diagram illustrating a feature of a slot machine according to the second embodiment of the present invention.
Figure 11:
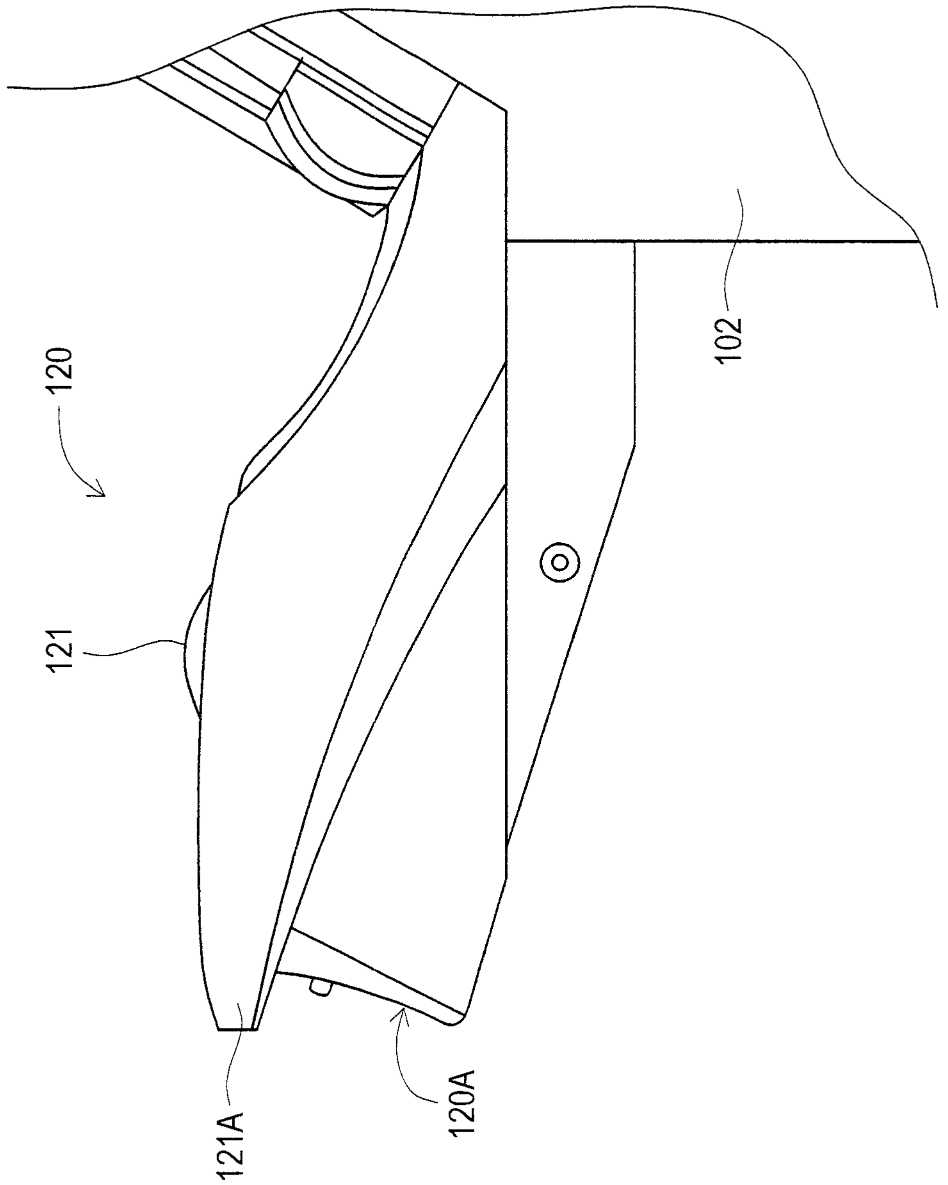
FIG. 11 is a side view illustrating an armrest of the slot machine according to the second embodiment of the present invention.

Also, the slot machine 101 is a slanted-type slot machine as is installed in game arcades such as casinos (refer to FIG. 10 and FIG. 11). In a case of the slanted-type slot machine, the player plays a game while sitting on a seat provided in front of the slot machine.

Here, the slot machine 101 according to the second embodiment has an armrest 120. The armrest 120 is protruded forward (in other words, in the direction of the player playing a game at the slot machine 101) from the front face of the slot machine 101. Therefore, a player rests his/her arm(s) (or his/her elbow(s)) on the armrest 120 while playing a game in the slot machine 101.

The slot machine 101 according to the second embodiment is provided with a player-information acquisition device 190 in the front face of the armrest 120 (refer to FIG. 10, etc.). The player-information acquisition device 190 has a control unit 191, a card reader 192 and an information display 193. The player-information acquisition device 190 reads out from a player-card 195 the information of the player with respect to games (hereinafter referred to as player-information), through the card reader 192. The player-information includes a piece of information with respect to the player's history of game results. The player-information acquisition device 190 displays the player-information read form the player-card 195 on the information display 193. Accordingly, the player can grasp his/her own player-information by checking the displayed contents of the information display 193.

The slot machine 101 according to the second embodiment has a control panel 125 on the top face of the armrest 120. Further, the control panel 125 is provided on the top face of the armrest 120 at a position closer to the cabinet 102 (refer to FIG. 10 and FIG. 11). The control panel 125 is operated by the player when a game is carried out.

Here, the player-card 195 may be used while being tied to the player's body with a wire or a string (hereinafter referred to as wire). By using the player-card 195 in this condition, the player can prevent his/her player-card 195 from missing. In this case, when the player-card 195 is loaded into the card reader 192, the wire is positioned between the front face of the armrest 120 and the player. Thus, the wire never comes in the proximity of the upper display 110A, the main display 110B, and the control panel 125. In other words, the operations etc. of the player to the game are designed to be never hampered by the wire. Accordingly, the slot machine 101 according to the present invention can offer a player an environment in which the player can concentrate on the game.

Next, the slot machine 101 according to the second embodiment will be described in detail with reference to the drawings. FIG. 10 is a perspective view showing an outer appearance of the slot machine 101 according to the second embodiment.

As shown in FIG. 10, the slot machine 101 has a cabinet 102. The cabinet 102 houses electrical and mechanical components for executing predetermined game aspects in the slot machine 101. For instance, the main control board 171 to be described later is housed in the lower portion of the cabinet 102. Four reels (specifically, a first reel 105, a second reel 106, a third reel 107 and a fourth reel 108) are provided inside the cabinet 102 in a freely rotating fashion. The first reel 105 through the fourth reel 108 each have a symbol string drawn on an outer peripheral surface thereof. Each symbol string is made up of a predetermined number of symbols. Also, each symbol string includes a plurality of types of symbols.

The cabinet 102 has the upper display 110A and the main display 110B provided at a front face thereof. The upper display 110A is provided at an upper front portion of the cabinet 102. The upper display 110A is made up of a heretofore known liquid crystal panel. The upper display 110A displays information with respect to a game. The display contents to be displayed on the upper display 110A include effect images, introduction of the game contents, game rule explanations and the like.

The main display 110B is provided at a middle front portion of the cabinet 102. The main display 110B is made up of a heretofore known transparent liquid crystal panel and the like. The main display 110B displays the current progress status with respect to the game. Specifically, the player proceeds with the game in the slot machine 101 based on the display of the main display 110B.

The main display 110B has a first display window 114, a second display window 115, a third display window 116 and a fourth display window 117. As described earlier, the first reel 105 through the fourth reel 108 are provided inside the cabinet 102. The main display 110B is positioned in front of the first reel 105 through the fourth reel 108. In the main display 110B, the first display window 114 through the fourth display window 117 are formed at portions corresponding to the first reel 105 through the fourth reel 108. For instance, the first display window 114 is formed at a position corresponding to the front of the first reel 105 of the main display 110B. In the slot machine 101, the inner side of the first display window 114 through the fourth display window 117 can be changed to a transparent state. This enables players to view behind the main display 110B through the first display window 114 through the fourth display window 117. Specifically, the players can see the symbols drawn on the first reel 105 through the fourth reel 108 through the first display window 114 through the fourth display window 117.

Figure 14:
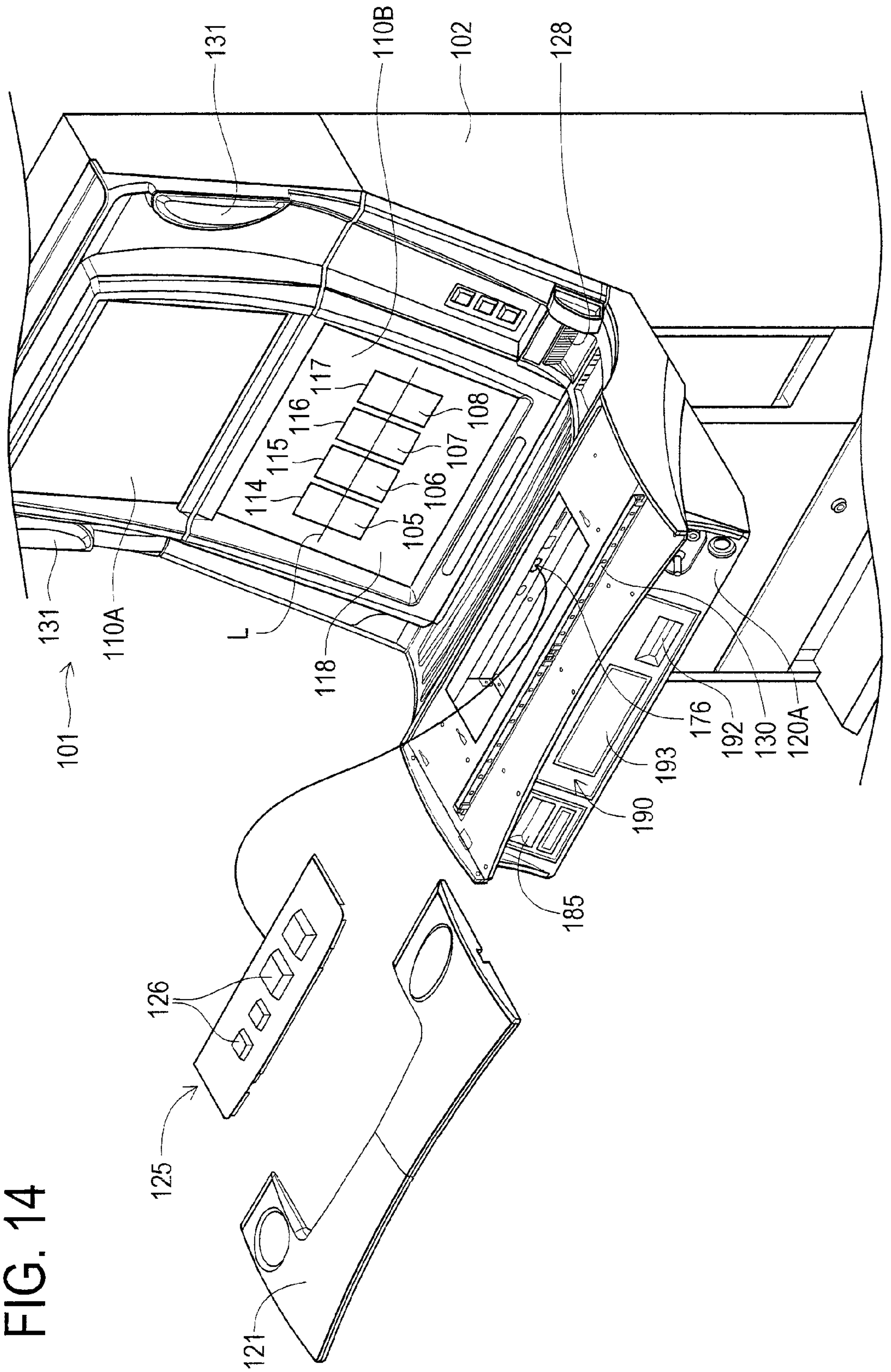
FIG. 14 is an explanatory diagram illustrating an example of connection with respect to a relay board according to the second embodiment of the present invention.

The main display 110B displays one pay line L (refer to FIG. 10 and FIG. 14). The pay line L crosses the center of the first display window 114 through the fourth display window 117 in a horizontal fashion. The pay line L defines a symbol combination constituting the game results. Accordingly, if the symbol combination which has been repositioned on the pay line L is a predetermined winning combination, the slot machine 101 awards a payout in accordance with this combination and the credit amount (bet amount) thus bet.

In the present invention, the number of reels is not limited to four reels. Specifically, the number of reels in the slot machine 101 can be changed to a different number.

Further, a touch panel 118 is provided on a front face of the main display 110B (refer to FIG. 10 and FIG. 14). Accordingly, the player can operate the touch panel 118 to input various types of commands. For instance, the players can select a desired selection from a plurality of selections which are displayed on the main display 110B, by pressing the touch panel 118 with a finger.

Luminescent devices 130 are provided at a peripheral edge of the upper display 110A and a peripheral edge of the main display 110B. A similar luminescent device 130 is provided at the armrest 120 (refer to FIG. 14). These luminescent devices 130 light up in a predetermined lighting fashion in a case predetermined conditions are satisfied (for instance, at the time of winning).

A bill slot 128 is formed at a front face of the cabinet 102. The bill slot 128 is adapted to accept bills into the cabinet 102. At the slot machine 101, the player can insert a predetermined ticket in the bill slot 128. Such a ticket is output from the ticket printer 185 as will be described later. This ticket includes information with respect to the amount of gaming values awarded to the player based on the game results. Specifically, the slot machine 101 can identify the amount of gaming values which can be used in the game based on the gaming value amount information included in such a ticket.

In the slot machine 101 according to the second embodiment, bills, tickets or electronic valuable information (credits) corresponding to these can be used as gaming values. The gaming values applicable to this invention are not limited to these. For instance, coins, medals, tokens, electronic money, tickets, etc. can also be employed.

As shown in FIG. 10, the slot machine 101 has speakers 131. The speakers 131 are provided in the front face of the cabinet 102. The speakers 131 are provided respectively on the left and right sides of the upper display 110A. The speakers 131 output sounds according to the progress of the game.

As mentioned above, the slot machine 101 has the armrest 120. The armrest 120 is formed so as to protrude in the direction of the player (in other words, frontward of the slot machine 101) from the front face of the cabinet 102 (refer to FIG. 10 and FIG. 11). The armrest 120 is formed in a portion below the main display 110B. While taking a seat in front of the slot machine 101, a player can play a game with his/her arm(s) rested on the armrest 120. Here, the arm(s) rested on the armrest 120 is(are) positioned higher than the lower end of the above-mentioned main display 110B.

The armrest 120 has an upper panel 121, the control panel 125, a woofer 180, the ticket printer 185 and the player-information acquisition device 190. The upper panel 121 is a portion which comes into contact with the arm(s), etc. of a player. The upper panel 121 is positioned higher than the lower end portion of the main display 110B (refer to FIG. 10 and FIG. 11). Accordingly, when the player puts his/her arm(s) on the upper panel 121, he/she looks down the main display 110B from a higher position. The control panel 125 has a plurality of operation buttons 126. The plurality of operation buttons 126 include a BET button, a COLLECT button, a START button, a CASHOUT button, and so on. The control panel 125 is used by a player to carry out operations in a game. The woofer 180 is a speaker specialized in low-pitched sound output. The ticket printer 185 outputs on a ticket the amount of gaming values that the player possesses when terminating a game in the slot machine 101. The player-information acquisition device 190 displays the player-information.

Next, the configuration of the armrest 120 in the slot machine 101 according to the second embodiment will be explained in detail with reference to the drawings. FIG. 11 is a side view of the armrest 120 of the slot machine 101.

Figure 12:
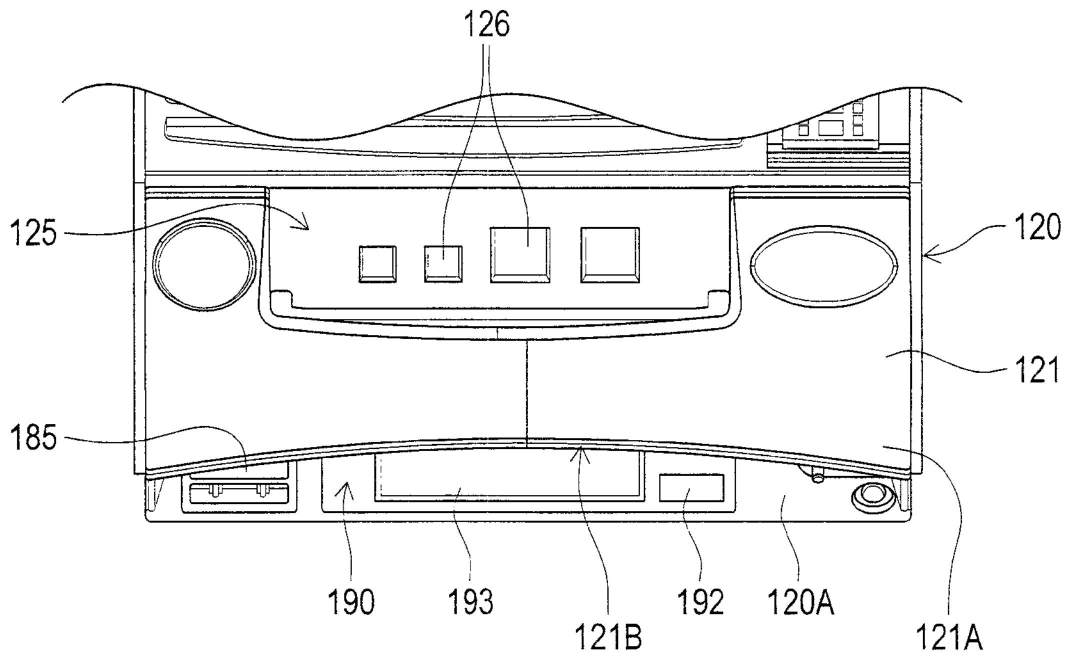
FIG. 12 is an explanatory diagram illustrating the armrest from a viewpoint of a player playing a game.

The armrest 120 is formed in front of the cabinet 102, as has been described above. The armrest 120 is protruded frontward of the cabinet 102 (in other words, in a direction of the player playing the game at the slot machine 101) from the lower end of the main display 110B. As shown in FIG. 10, FIG. 12 and the like, the armrest 120 is provided with a control panel 125 on the top face thereof. The control panel 125 is provided on the top face of the armrest 120 at the position closer to the cabinet 102. Accordingly, when playing the game at the slot machine 101, the player operates the control panel 125 and the touch panel 118 while resting his/her arm(s) (or elbow(s)) on the armrest 120.

The armrest 120 includes a sloped surface 120A. The sloped surface 120A makes up the front face of the armrest 120. The front face of the armrest 120 is inclined at a predetermined angle toward the cabinet 102 so as to form the sloped surface 120A. Thus, the upper portion of the sloped surface 120A is positioned closer to the cabinet 102 with respect to the lower portion of the sloped surface 120A (refer to FIG. 11).

The player-information acquisition device 190 is provided in the sloped surface 120A. Specifically, the information display 193 is provided at the central portion of the sloped surface 120A (refer to FIG. 10, FIG. 12, etc). The information display 193 is provided along the inclination of the sloped surface 120A. In other words, the screen of the information display 193 is inclined toward the cabinet 102 at a predetermined angle, likewise the sloped surface. Accordingly, the slot machine 101 can convey the displayed contents of the information display 193 even if the information display 193 is looked down from the upper point. In this case, the seated player can recognize the contents of the player-information displayed on the information display 193 only by tilting his/her head downward. Thus, the slot machine 101 can reduce the amount of body movement of the player in confirming the player-information.

The card reader 192 is provided on the right side of the information display 193. That is, the card reader 192 is provided in a position closer to the player than the cabinet 102 and the control panel 125 are (refer to FIG. 10 and FIG. 11). Accordingly, the player can load his/her own player-card 195 into the card reader 192 even more easily. The ticket printer 185 is provided on the left portion of the sloped surface 120A.

As described above, the card reader 192 is provided in the sloped surface 120A. That is, if a player-card 195 is loaded into the card reader 192, the player-card 195 is positioned close to the player playing the game (i.e., in a proximity of the waist of the seated player). Accordingly, when the player-card 195 is tied to the player with a wire, the wire is positioned along the body of the player.

Here, the control panel 125 is provided in a position closer to the cabinet 102 on the top face of the armrest 120 (refer to FIG. 10 and FIG. 12). That is, the wire is never present in an area between the control panel 125 or the touch panel 118, and the arm(s) of the player put on the top face of the armrest 120. In other words, the player can execute the operations with respect to the control panel 125 or the touch panel 118 without being hampered by the wire. As a result, the slot machine 101 can offer the player an environment in which the player can concentrate on the game.

As shown in FIG. 11, the armrest 120 has an overhang portion 121A. The overhang portion 121A is formed at the upper panel 121 on the upper portion of the front face of the armrest 120. The overhang portion 121A is formed by positioning the end portion on the player-side of the upper panel 121 closer to the player than the upper portion of the sloped surface 120A. As described above, the upper panel 121 is a portion designed for supporting the arm(s) (or elbow(s)) of a player playing a game. Accordingly, in the slot machine 101, the area for supporting the arm(s) etc. of the player can be made larger through providing the overhang portion 121A for the armrest 120.

The overhang portion 121A has a concave-curve portion 121B. The concave-curve portion 121B is formed through positioning the center of the overhang portion 121A closer to the cabinet 102 than both end portions on the right and left of the overhang portion 121A are (refer to FIG. 12). The center of the overhang portion 121A is located in the proximity of the upper end of the sloped surface 120A. That is, the lower portion of the sloped surface 120A is positioned closer to the player than the center portion of the concave-curve portion 121B. Accordingly, when looking down in a seated position, the player can recognize the information display 193 provided in the center of the sloped surface 120A through the concave-curve portion 121B without being hindered by the overhang portion 121A (refer to FIG. 12).

The both end portions on the right and left of the overhang portion 121A are positioned closer to the player than the center of the concave-curve portion 121B and the upper end of the sloped surface 120A (refer to FIG. 10 and FIG. 11) are. In general, when a player is seated facing the front of the slot machine 101, both arms of the player are put on the right and left portions of the upper panel 121. Here, the upper panel 121 secures a sufficient depth at both of the right and left portions compared with a depth at the center thereof. Accordingly, the player can decide, from a larger area, where on the upper panel 121 to put his/her arms. That is, the slot machine 101 can increase flexibility with respect to a player's posture when playing a game. As a result, the slot machine 101 can offer a player a better environment for playing a game.

Figure 13:
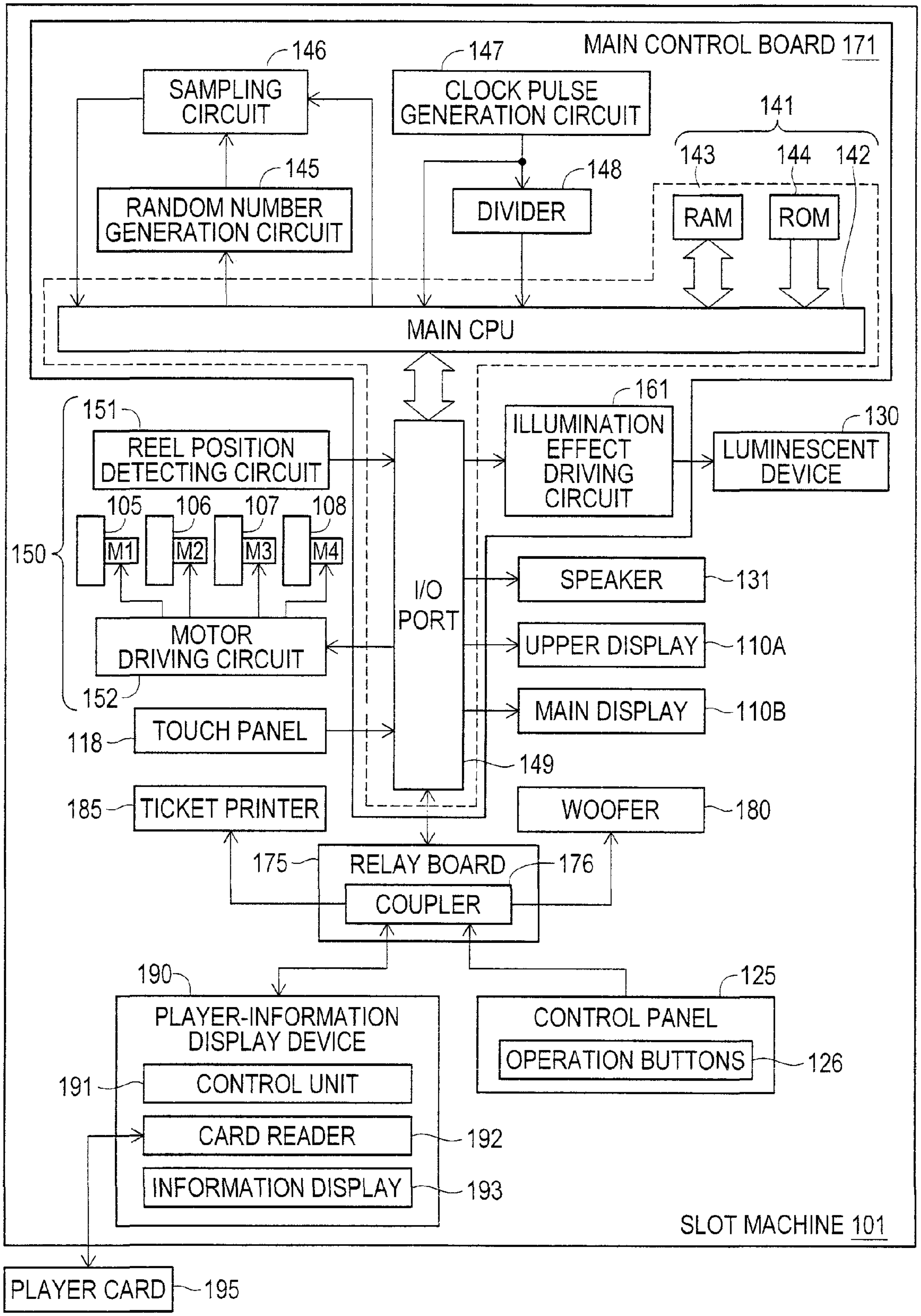
FIG. 13 is a block diagram illustrating an internal configuration of the slot machine according to the second embodiment of the present invention.

Next, an internal configuration of the slot machine 101 will be explained with reference to the drawings. FIG. 13 is a block diagram illustrating an internal configuration of the slot machine 101.

As shown in FIG. 13, the slot machine 101 includes a plurality of components along with a main control board 171 as the main component. The main control board 171 includes a controller 141 for executing control programs. The main control board 171 is housed in the lower portion of the cabinet 102.

The controller 141 includes a main CPU 142, RAM 143 and ROM 144. The main CPU 142 inputs and outputs signals to and from other components via an I/O port 149 so as to carry out programs stored in the ROM 144. Accordingly, the main CPU 142 works as the center of control with respect to the slot machine 101. The RAM 143 temporarily stores data or programs to be used during an operation of the main CPU 142. For instance, random numbers which are sampled by the after-mentioned sampling circuit 146 are stored temporarily in the RAM 143. The ROM 144 stores programs executed by the main CPU 142 and static data.

The controller 141 executes control with respect to the sound output in the slot machine 101. That is, the controller 141 controls the speakers 131 and the woofer 180. The controller 141 executes control with respect to the contents displayed in the upper display 110A and the main display 110B.

Specifically, the programs stored in the ROM 144 include game programs and game system programs (hereinafter referred to as "game programs" etc). A lottery program is also included in the game programs.

The lottery program is a program used to determine the code number of each reel, the first reel 105 through the fourth reel 108. The code number corresponds to each symbol rearranged on the payline L. The lottery program includes symbol weighing data. The symbol weighing data correspond to plural kinds of payout rates (for instance, 80%, 84% and 88%), respectively. The symbol weighing data are the data indicating correlation between the code number of each of the reels, the first reel 105 through the fourth reel 108, and one or plural random numbers within a predetermined number range (for instance, 0 to 255).

The main control board 171 includes a random number generation circuit 145, a sampling circuit 146, a clock pulse generation circuit 147 and a divider 148, along with the controller 141.

The random number generation circuit 145 is operated according to the commands from the main CPU 142, and generates random numbers within a predetermined range. The sampling circuit 146 arbitrarily extracts random numbers from the random numbers generated by the random number generation circuit 145 in accordance with the commands from the main CPU 142. The sampling circuit 146 inputs the extracted random numbers to the main CPU 142. The clock pulse generation circuit 147 generates a base clock for the operation of the main CPU 142. The divider 148 inputs to the main CPU 142 the signals which are generated by dividing the base clock by a predetermined frequency.

A reel driving unit 150 is connected to the main control board 171. The reel driving unit 150 includes a reel position detecting circuit 151 and a motor driving circuit 152. The reel position detecting circuit 151 detects the stopped positions of the first reel 105, the second reel 106, the third reel 107 and the fourth reel 108, respectively. The motor driving circuit 152 inputs driving signals to a first motor M1, a second motor M2, a third motor M3 and a fourth motor M4. The first motor M1 through the fourth motor M4 are respectively connected to the first reel 105 through the fourth reel 108. The first motor M1 through the fourth motor M4 are operated based on the input of driving signals from the motor driving circuit 152. Accordingly, the first reel 105 through the fourth reel 108 are rotated and stopped at a desired position respectively by the first motor M1 through the fourth motor M4.

Furthermore, the touch panel 118 is connected to the main control board 171. The touch panel 118 specifies the coordinate position of the portion touched by a player. The touch panel 118 determines the position on which the player touched and the direction of the movement of the touched portion based on the information of the specified coordinate position. The signals corresponding to the determination are input to the main CPU 142 through the I/O port 149.

The main control board 171 also includes an illumination effect driving circuit 161. The illumination effect driving circuit 161 outputs an effect signal to the above-mentioned luminescent device 130. When the effect signal is input, the luminescent device 130 is illuminated in a predetermined illuminating fashion. As a result, the slot machine 101 executes effects in accordance with the game progress.

The main control board 171 is connected to the upper display 110A, the main display 110B and the speakers 131, respectively. The controller 141 transmits control signals to the upper display 110A, the main display 110B and the speakers 131 based on the game program. As mentioned above, the speakers 131 output sounds according to the progress of the game based on the control signal output from the controller 141. The upper display 110A and the main display 110B display various kinds of information based on control signals which are output from the controller 141.

The main control board 171 is connected to a relay board 175. The relay board 175 has a coupler 176 (refer to FIG. 13 and FIG. 14). Through the coupler 176, the relay board 175 is connected to the control panel 125, the woofer 180, the ticket printer 185, and the player-information acquisition device 190. The control signal output from the controller 141 is input through the relay board 175 to the peripheral devices (that is, the woofer 180, the ticket printer 185 and the player-information acquisition device 190) which are connected to the relay board 175. Also, the relay board 175 inputs to the controller 141 a signal from peripheral devices connected through the coupler 176.

The relay board 175 has a control unit (not shown). The control unit executes control with respect to the input/output of a signal between the controller 141 and each of the peripheral devices connected to the relay board 175. For instance, when a control signal is input from the controller 141, the control unit specifies a peripheral device which is the target of the control signal. Then, the control unit inputs the control signal to the specified peripheral device.

As shown in FIG. 13 and FIG. 14, the control panel 125 is connected to the controller 141 through the coupler 176 and the relay board 175. The control panel 125 has operation buttons 126. The operation buttons 126 include the START button for instructing execution of a game, the COLLECT button, a BET button and so on. Upon being held down, each button included in the operation buttons 126 inputs an operation signal to the controller 141 through the coupler 176 and the relay board 175.

The woofer 180 is connected to the controller 141 through the coupler 176 and the relay board 175. As mentioned above, the woofer 180 is a speaker specialized in the sound output which corresponds to the low-pitch range of the human auditory range. The control signal which is output from the controller 141 is input to the woofer 180 through the relay board 175 and the coupler 176. The woofer 180 outputs sounds corresponding to the low-pitch range based on the input control signal. Thus, the woofer 180 can output sounds corresponding to the low-pitch range according to the progress of the game.

The ticket printer 185 is connected to the controller 141 through the coupler 176 and the relay board 175. The ticket printer 185 outputs a ticket which contains information indicating the amount of gaming values. For instance, when ending a game, the controller 141 inputs, to the ticket printer 185, information indicating the amount of the gaming value which the player possesses and a control signal through the relay board 175 and the coupler 176. In this case, in response to the control signal, the ticket printer 185 can print out a ticket containing information indicating the amount of the gaming value.

A player-information acquisition device 190 is connected to the controller 141 through the coupler 176 and the relay board 175. The player-information acquisition device 190 has a control unit 191, a card reader 192 and an information display 193. A player-card 195 stores player-information and the player-information acquisition device 190 reads out the player-information from the player-card 195 through the card reader 192. The player-information acquisition device 190 displays the player-information on the information display 193. Thus, the player-information acquisition device 190 can notify the player of his/her own player-information (for instance, his/her personal history of game results).

The control unit 191 takes charge of the control of the whole player-information acquisition device 190. Specifically, the control unit 191 controls the card reader 192 and the information display 193 based on a control signal output from the controller 141.

The card reader 192 reads out the player-information which is stored in the player-card 195 according to the control of control unit 191. Also, the card reader 192 can also write predetermined kinds of information (for instance, information on the history of game results) in the player-card 195 according to the control of the control unit 191. The player-card 195 is a card which the player possesses on an individual basis. The player-card 195 incorporates a storage medium therein which can store various kinds of information with respect to games.

The information display 193 displays the player-information read out from the player-card 195. The information display 193 displays the player-information in accordance with the control of the control unit 191. The player can confirm his/her own player-information by seeing the displayed contents on the information display 193.

Here, the relay board 175 is provided inside the cabinet 102 in the proximity of the lower end portion of the main display 110B. Then, the coupler 176 of the relay board 175 faces the inside of the armrest 120. As shown in FIG. 14, the control panel 125 is connected to the relay board 175 through the coupler 176 which faces inside the armrest 120. The coupler 176 is also called a connector. By using a hand or a simple tool, the coupler 176 can be easily attached or detached. In other words, the control panel 125 can be easily attached onto or detached from the relay board 175 with a hand of an operator and so on.

The control panel 125 is one example of the peripheral devices connected to the relay board 175 through the coupler 176. As mentioned above, the woofer 180, the ticket printer 185 and the player-information acquisition device 190 are also connected to the relay board 175 through the coupler 176 (refer to FIG. 13). Accordingly, the woofer 180, the ticket printer 185 and the player-information acquisition device 190 can also be easily detached from or attached onto the relay board 175 with the hand of the operator and so on.

Here, some game arcades installing the slot machine 101 etc. may own player-information acquisition devices 190. That is, when installing a slot machine 101 in a game arcade, an operator may attach, to the slot machine 101, a player-information acquisition device 190 which the game arcade owns. As above described, the slot machine 101 is connected to the player-information acquisition device 190 through the relay board 175 and the coupler 176. That is, the operator can easily detach/attach the player-information acquisition device 190 through the coupler 176 and the relay board 175 from/to the slot machine 101. Accordingly, the slot machine 101 can drastically reduce the workload at detachment/attachment of the player-information acquisition device 190.

The coupler 176 of the relay board 175 faces the inside of the armrest 120. That is, in a case of detachment/attachment work with respect to the peripheral devices provided in the armrest 120 from/onto the relay board 175, the operator can complete the work without accessing the inside of the cabinet 102. In other words, this slot machine 101 can reduce the number of times to access the main control board 171 which is provided inside the cabinet 102. As a result, it becomes possible for this slot machine 101 to prevent a fraudulent modification to the main portion including the main control board 171.

As explained above, the slot machine 101 according to the second embodiment is provided with the armrest 120 in front of the cabinet 102. The armrest 120 is provided with the player-information acquisition device 190 in the sloped surface 120A on the front face of the armrest 120. The player-information acquisition device 190 reads out player-information from the player-card 195 using the card reader 192. The player-information acquisition device 190 displays the read player-information on the information display 193. The armrest 120 has the control panel 125 on the top face of the armrest 120 in a location closer to the cabinet 102. Accordingly, the player executes operations to the control panel 125 while putting his/her arm(s) on the top face of the armrest 120.

Here, the player-card 195 may be loaded into the card reader 192 while being tied to the player with a wire. In the slot machine 101 according to the second embodiment, when the player-card 195 is used in this way, the wire is positioned between the sloped surface 120A of the armrest 120 and the body of the player. This means that the wire is never located in the proximity of the control panel 125 or the touch panel 118. Accordingly, the player can execute the operations with respect to a game at the slot machine 101 without being hampered by the wire. Thus, the slot machine 101 according to the second embodiment can offer an environment in which the player can concentrate on games better. The card reader 192 is provided on the sloped surface 120A which configures the front face of the armrest 120. Accordingly, the slot machine 101 can offer a player a convenience of the easiness in the loading operation of the player-card 195.

The armrest 120 of the slot machine 101 has an overhang portion 121A. The overhang portion 121A is protruded from the upper end of the front face of the armrest 120 (i.e., the sloped surface 120A) in the direction of the player (i.e., in the frontward direction of the cabinet 102). Thus, by providing the overhang portion 121A on the armrest 120, the slot machine 101 can increase the area of the top face of the armrest 120. That is, the slot machine 101 secures a large area on which a player can put his/her arm(s). Accordingly, the slot machine 101 can offer a player an environment in which the player can execute a game in a comfortable posture.

The overhang portion 121A includes the concave-curve portion 121B in the front face thereof. The center of the concave-curve portion 121B is positioned in the proximity of the upper end of the sloped surface 120A, in a point closer to the cabinet 102 than the lower end of the sloped surface 120A is positioned. The information display 193 is provided in the central portion of the sloped surface 120A. Accordingly, when seated facing the front of the slot machine 101, the player can recognize the contents displayed on the information display 193 (that is, his/her own player-information), just by tilting his/her head downwards. Thus, the slot machine 101 can reduce the trouble for the player of confirming the information notified by the player-information acquisition device 190.

In addition, the slot machine 101 is provided with the relay board 175. The player-information acquisition device 190 is connected to the controller 141 provided on the main control board 171, through the relay board 175 and the coupler 176. That is, the player-information acquisition device 190 can be detached from or attached to the relay board 175 and the controller 141 through connecting/disconnecting the coupler 176. Thus, if there is some malfunction in the player-information acquisition device 190, the manager of the slot machine 101 can replace the player-information acquisition device 190 without accessing to the main portion (for instance, the main control board 171 etc.) of the slot machine 101. Accordingly, the slot machine 101 can prevent an occurrence of a malfunction in the main portion (for instance, the main control board 171). Further, the slot machine 101 can reduce the number of cases of modification of the main portion (for instance, the main control board 171) so that the slot machine 101 can prevent a fraud due to a modification on the main portion.

The game arcade installing the slot machine 101 often owns a player-information acquisition device 190. In this case, the manager of the game arcade may have to have an operator load the player-information acquisition device 190 owned by the game arcade onto the slot machine 101. As above mentioned, the coupler 176 of the relay board 175 is generally provided in a position easier to access than the main control board 171 is (refer to FIG. 14). Accordingly, the slot machine 101 can lighten the operator's workload at loading the player-information acquisition device.

The present invention is not limited to the above-described embodiment, and it is obvious that various improvements and modifications can be made thereto without departing from the spirit of the present invention. For instance, this invention is not limited to a slot machine 101 having four reels. This invention can be adopted in various gaming machines if a player-information acquisition device 190 is provided in the front face of an armrest 120 thereof. For instance, this invention can be applied to a video slot machine and a card game machine.

The types of player-information acquisition device 190 according to the present invention are also not limited to those described in the above-described embodiment. For instance, the player-information acquisition device 190 does not necessarily include the control unit 191 therein. In such a case, the controller 141 provided for the slot machine 101 may execute the control which is executed by the control unit 191.

The storage medium according to the present invention is not limited to the player-card 195 in the above-described embodiment. Various kinds of storage medium can be used if the storage medium can store the player-information. The stored contents of the player-card 195 do not necessarily include the detailed information making up the player-information of the player (for instance, a piece of information on the game history of the player etc.), if a piece of information with which a player can be identified is included therein. In such a case, it is preferable that the detailed information on the identified player is acquired through a network and displayed on the information display 193.

A detailed configuration in the above case will be described. A gaming machine is connected to a server through the network. The server administers, with respect to each player, each piece of player-information including detailed information. A storage medium stores information with which a player can be identified (for instance, ID information). When the storage medium is loaded into a reading device, the gaming machine identifies the player directed to the storage medium based on the information read by the reading device. The gaming machine then acquires the player-information directed to the identified player from the server and displays the acquired player-information on a display included in the player-information acquisition device.

The invention claimed is:

1. A gaming machine comprising:

a cabinet;

a display provided in the cabinet and including a display surface for displaying information with respect to a game;

a frontward protruding portion projected frontward of the gaming machine from a lower end of the display provided in the cabinet; and a human contact portion provided in the frontward protruding portion that is configured to contact with a part of a player's body, wherein the lower end of the display surface is positioned lower than the human contact portion.

2. The gaming machine according to claim 1, wherein, in a perpendicular cross sectional view with reference to a front view of the gaming machine:

a first straight line passes through an end portion of the human contact portion on a cabinet side and the lower end of the display surface;

a second straight line passes through a central point of the display surface vertically with respect to the display surface; and the first straight line and the second straight line intersect further backward of the cabinet than the lower end of the display surface.

3. The gaming machine according to claim 1, further comprising:

a connecting surface connecting an end portion of the human contact portion of a cabinet side with the lower end of the display, wherein the connecting surface comprises a raised portion on an upper face thereof, wherein the raised portion is formed in a curved shape being parallel with respect to a width direction of the gaming machine, and wherein a circular portion of the raised portion faces the human contact portion.

4. The gaming machine according to claim 1, wherein the connecting surface comprises a protruding wall formed along an edge portion thereof which faces the lower end of the display so as to protrude upward from the connecting surface.

5. The gaming machine according to claim 1, further comprising a moving device which allows the frontward projecting portion to move up and down with respect to the cabinet.

6. A gaming machine comprising:

a cabinet;

a display provided in the cabinet and including a display surface for displaying information with respect to a game;

a frontward protruding portion projected from a lower end of the display provided in the cabinet frontward of the gaming machine;

a human contact portion provided in the frontward protruding portion that is configured to contact with a part of a player's body; and a connecting surface connecting an end portion of the human contact portion of a cabinet side with the lower end of the display, wherein the lower end of the display surface is positioned lower than the human contact portion, wherein, in a perpendicular cross sectional view with reference to a front view of the gaming machine:

a first straight line passes through an end portion of the human contact portion on a cabinet side and the lower end of the display surface;

a second straight line passes through a central point of the display surface vertically with respect to the display surface; and the first straight line and the second straight line intersect further backward of the cabinet than the lower end of the display surface, wherein the connecting surface comprises a raised portion on an upper face thereof, wherein the raised portion is formed in a curved shape being parallel with respect to a width direction of the gaming machine, and wherein a circular portion of the raised portion faces the human contact portion.

7. A gaming machine comprising:

a cabinet housing therein a control board, the control board comprising a processor configured to execute control with respect to a game;

an armrest protruding frontward from a front face of the cabinet;

a player-information acquisition device provided in a front face of the armrest, comprising a reading device wherein a storage medium is attachable thereto, the storage medium configured to store information concerning a player with respect to a game, the reading device configured to read the information from the storage medium; and an operation unit provided closer to the cabinet than the player-information acquisition device is, the operation unit configured to transmit a signal to the processor.

8. The gaming machine according to claim 7, wherein the player-information acquisition device comprises:

a display device configured to execute a display based on the information read by the reading device; and wherein the armrest comprises:

a sloped surface wherein an upper portion of the front face of the armrest is positioned closer to the cabinet than a lower portion of the front face of the armrest is; and an overhang portion protruding from the upper portion of the front face of the armrest, the overhang portion being formed in a concave-curved shape with a center portion of a front face of the overhang portion positioned closer to the cabinet compared with both end portions of the front face of the overhang portion.

9. The gaming machine according to claim 7, further comprising:

a relay board connected to the control board, wherein the player-information acquisition device is detachably connected to the relay board, and wherein, through the relay board, the processor executes control with respect to a reading operation of the information by the reading device.

10. The gaming machine according to claim 8, further comprising:

a relay board connected to the control board, wherein the player-information acquisition device is detachably connected to the relay board, and wherein, through the relay board, the processor executes control with respect to a reading operation of the information by the reading device, and control with respect to a display operation of the information on the display device.

11. A gaming machine comprising:

a main display arranged in a front face of a cabinet and configured to display information with respect to a game; and a frontward protruding portion having a predetermined thickness in a vertical direction and projecting frontward of the gaming machine from a lower end of the main display, wherein the gaming machine is configured to execute a game carried out by a game player seated in front thereof, wherein the main display is provided in a slanted fashion at a predetermined angle of inclination such that a lower end thereof is positioned further frontward than an upper end thereof, wherein, an upper face of the frontward protruding portion comprises:

a concave connecting surface extending from the lower end of the main display and to a generally horizontally disposed surface;

an operation unit disposed on the generally horizontally disposed surface which is configured for operating the gaming machine; and a human contact portion provided on the generally horizontally disposed surface, and wherein a portion having the predetermined thickness of the frontward protruding portion accommodates a card reader configured to read player information from a player-information acquisition device, an information display unit, and a ticket printer.

12. The gaming machine according to claim 11, wherein the gaming machine further comprises an upper display arranged above the main display in front of the cabinet of the gaming machine, wherein the main display is provided in the front face of the cabinet of the gaming machine at the predetermined angle of inclination such that a slanted direction of liquid crystal molecules thereof become slanted when voltage is applied thereto such that lower ends of the liquid crystal molecules are positioned more frontward than upper ends of the liquid crystal molecules, and wherein the upper display is provided in the front face of the cabinet of the gaming machine at an angle of inclination that is smaller than the predetermined angle of inclination of the main display such that a slanted direction of liquid crystal molecules thereof become slanted when voltage is applied thereto such that lower ends of the liquid crystal molecules are positioned more frontward than upper ends of the liquid crystal molecules.

13. The gaming machine according to claim 12, wherein the gaming machine further comprises, inside the cabinet:

a control board comprising a processor configured to execute control with respect to a game;

a relay board connected to the control board and configured to relay a control signal to the control board, and wherein the relay board comprises a coupler for making connection to the operation unit, the coupler arranged so as to be positioned adjacent to an inner space of the frontward projecting portion having an opening formed at an arrangement portion of the operation unit at an upper face of the frontward projecting portion.

* * * * *